(12) United States Patent
Sunkara et al.

(10) Patent No.: US 7,252,811 B2
(45) Date of Patent: *Aug. 7, 2007

(54) LOW TEMPERATURE SYNTHESIS OF SILICON FIBERS

(75) Inventors: Mahendra Kunmar Sunkara, Louisville, KY (US); Shashank Sharma, Sunnyvale, CA (US)

(73) Assignee: University of Louisville, Louisville, KY (US)

( * ) Notice: Subject to any disclaimer, the term of this patent is extended or adjusted under 35 U.S.C. 154(b) by 118 days.

This patent is subject to a terminal disclaimer.

(21) Appl. No.: 10/187,460

(22) Filed: Jul. 1, 2002

(65) Prior Publication Data

US 2003/0039602 A1 Feb. 27, 2003

Related U.S. Application Data

(63) Continuation-in-part of application No. 09/896,834, filed on Jun. 29, 2001, now Pat. No. 6,806,228.

(60) Provisional application No. 60/302,062, filed on Jun. 29, 2001, provisional application No. 60/214,963, filed on Jun. 29, 2000.

(51) Int. Cl.
*C01B 33/20* (2006.01)
(52) U.S. Cl. ...................................... 423/326; 423/324
(58) Field of Classification Search ................ 423/324, 423/326; 438/726; 502/439, 263, 355; 501/95.2; 65/33.2
See application file for complete search history.

(56) References Cited

U.S. PATENT DOCUMENTS

| 4,886,683 A | | 12/1989 | Hoke et al. | |
| 4,939,308 A | * | 7/1990 | Maxfield et al. | ............ 505/434 |
| 5,120,707 A | * | 6/1992 | Maxfield et al. | ............ 505/325 |
| 5,334,296 A | | 8/1994 | Henkens et al. | |
| 5,381,753 A | | 1/1995 | Okajima et al. | |
| 5,725,674 A | | 3/1998 | Moustakas et al. | |
| 5,858,862 A | | 1/1999 | Westwater et al. | |
| 5,922,183 A | | 7/1999 | Rauh | |
| 5,962,863 A | | 10/1999 | Russell et al. | |
| 6,033,866 A | | 3/2000 | Guo et al. | |
| 6,051,849 A | | 4/2000 | Davis et al. | |
| 6,063,246 A | | 5/2000 | Wolfe et al. | |
| 6,806,228 B2 | * | 10/2004 | Sharma et al. | ............... 502/439 |

FOREIGN PATENT DOCUMENTS

| JP | 2086121 | 3/1990 |
| JP | 11177134 | 7/1999 |

OTHER PUBLICATIONS

Publication No. WO026422A1 for "High Purity Gallium for Preparation of Compound Semiconductor, and Method and Apparatus for Purifying the Same" by Yamamura et al., published on May 11, 2000.
Publication No. WO9965068A1 for "Fabrication of Gallium Nitride Semiconductor Layers by Lateral Growth from Trench Sidewalls" by Zheleva et al., published on Dec. 16, 1999.
Publication No. WO9944224A1 for "Method of Fabricating Gallium Nitride Semiconductor Layers by Lateral Overgrowth Through Masks, and Gallium Nitride Semiconductor Structures Fabricated Thereby" by Davis et al., published on Sep. 2, 1999.
Y.F. Zhang, Y.H. Tang, N. Wang, C.S. Lee, I. Bello, S.T. Lee "One-Dimensional Growth Mechanism of Crystalline Silicon Nanowires", Journal of Crystal Growth 197 (1999) 136-140.
J. Westwater, D.P. Gosain, S. Tomiya, S. Usui, and H. Ruda "Growth of Silicon Nanowires Via Gold/Silane Vapor-Liquid-Solid Reaction", J. Vac. Sci. Technol. B 15(3), May/Jun. 1997, 554-557.
A M Morales and C.M. Lieber "A Laser Ablation Method for the Synthesis of Crystalline Semiconductor Nanowires", Science, vol. 279, Jan. 9, 1998. 208 211.
H.F. Yan, Y.J. Xing, Q.L. Hang, D.P. Yu, Y.P. Wang, J. Xu, Z.H. Xi, S.Q. Feng "Growth of Amorphous Silicon Nanowires Via A Solid-Liquid-Solid Mechanism", Chemical Physics Letters 323 (2000) 224-228.
J.L. Gole and J.D. Stout, W.L. Rauch and Z.L. Wang "Direct Synthesis of Silicon Nanowires, Silica Nanospheres, and Wire-Like Nanosphere Agglomerates", Applied Physics Letters, vol. 76, No. 17, Apr. 24, 2000, 2346-2348.
J.D. Holmes, K.P. Johnston, R.C. Doty, B. A. Korgel "Control of Thickness and Orientation of Solution-Grown Silicon Nanowires", Science, vol. 287, Feb. 25, 2000, 1471-1473.
P Scheier, J. Marsen, M Lonfat, W Schneider, K. Sattler "Growth of Silicon Nanostructures on Graphite", Surface Science 458 (2000, 113-122.
D.P. Yu, Z.G. Bai, Y. Ding, Q.L. Hang, H.Z. Zhang, J.J. Wang, Y.H. Zou, W. Qian, G.C. Xiong, H.T. Zhou, and S.Q. Feng "Nanoscale Silicon Wires Synthesized Using Simple Physical Evaporation", Applied Physics Letters, vol. 72, No. 26, Jun. 29, 1998, 3458-3460.
Y.F. Zhang, Y H Tanh, N. Wang, D.P. Yu. C S Lee, I. Bello, and S.T. Lee "Silicon Nanowires Prepared by Laser Ablation at High Temperature", Applied Physics Letters, vol. 72, No. 15, Apr. 13, 1998, 1835-1837.

(Continued)

*Primary Examiner*—Edward M. Johnson
(74) *Attorney, Agent, or Firm*—Carrithers Law Office, PLLC; David W. Carrithers

(57) ABSTRACT

This invention presents a process to produce bulk quantities of nanowires of a variety of semiconductor materials. Large liquid gallium drops are used as sinks for the gas phase solute, generated in-situ facilitated by microwave plasma. To grow silicon nanowires for example, a silicon substrate covered with gallium droplets is exposed to a microwave plasma containing atomic hydrogen. A range of process parameters such as microwave power, pressure, inlet gas phase composition, were used to synthesize silicon nanowires as small as 4 nm (nanometers) in diameter and several micrometers long. As opposed to the present technology, the instant technique does not require creation of quantum sized liquid metal droplets to synthesize nanowires. In addition, it offers advantages such as lower growth temperature, better control over size and size distribution, better control over the composition and purity of the nanowires.

22 Claims, 31 Drawing Sheets

OTHER PUBLICATIONS

D.P. Yu, Y.J Xing, Q.L. Hang, H.F Yan. J Xu, Z H. Xi, S.Q. Feng "Controlled Growth of Oriented Amorphous Silicon Nanowires Via A Solid-Liquid-Solid (SLS) Mechanism", Physica E 9 (2001) 305-309.

Lieber, "One-Dimensional Nanostructures: Chemistry, Physics & Applications", Solid State Communications. vol. 107, No. 11 607-616.

Sharma et al "Novel Vapor-Liquid-Solid Synthesis Method for Carbon Nanostructures", presented on CD and at Carbon2001 Conference at the University of Kentucky, Lexington, KY in Jul. of 2001.

Zhang et al "Morphology and Growth Mechanism Study of Self-Assembled Silicon Nanowires Synthesized by Thermal Evaporation", Chemical Physics Letters 337 (2001) 18-24, Mar. 30, 2001.

Wu et al. "Germanium Nanowire Growth Via Simple Vapor Transport", Chem. Mater. 2000, 12, 605-607.

* cited by examiner

LOW TEMPERATURE SYNTHESIS OF SILICON FIBERS

This Application is a continuation in part of U.S. Pat No. 6,806,228 issued on Oct. 19, 2004 from application Ser. No. 09/896,834 filed on Jun. 29, 2001 which claims priority from copending U.S. Provisional application Serial No. 60/214,963 filed on Jun. 29, 2000 and from U.S. provisional application 60/302,062 filed on Jun. 29, 2001 and from U.S. application Ser. No. 10,664,072 filed on Sep. 26, 2003 all of which are incorporated by reference herein.

This application is part of a government project. The research leading to this invention was supported by a Grant Number 9876251 from the National Science Foundation. The United States Government retains certain rights in this invention.

BACKGROUND OF THE INVENTION

1. Field of the Invention

The invention relates to the field of providing a synthesis technique to grow bulk quantities of semiconductor nanowires at temperatures less than 500° C.

2. Description of the Prior Art

One-dimensional semiconductor fibers are useful for many applications ranging from probe microscopy tips to interconnections in nanoelectronics. By "one-dimensional" it is meant that the fibers have extremely small diameters, approaching 40 Ångstroms. The fibers may be termed "nanowires" or "nanowhiskers." Several methods are known for synthesis of these fibers. Included are VLS (vapor-liquid-solid) growth mechanism based laser ablation of silicon and silicon oxide species, and variations of these techniques.

In VLS growth, a liquid metal cluster or catalyst acts as the energetically favored site of absorption of gas-phase reactants. The cluster supersaturates and the material grows in one dimension. VLS mechanism has been used to grow silicon nanowires by catalytic decomposition of silane vapor on a gold metal surface. Variations of this mechanism have been used to produce other semiconductor fibers.

One variation is laser ablation. In this technique, the silicon oxide species, such as $SiO_2$, is ablated to the vapor phase by laser excitation.

SUMMARY OF THE INVENTION

The present invention provides a method of synthesizing semiconductor fibers by placement of gallium or indium metal on a suitable substrate, placing the combination in a low pressure chamber at a vacuum from 100 mTorr to one atmosphere in an atmosphere containing desired gaseous reactants, raising the temperature of the metal above its melting point by microwave excitation, whereby the precursors form fibers of the desired length. When the metal is gallium, a temperature of about at least 50° C. is sufficient, preferably near 300° C. for best solubility and mobility within the melt. When the metal is indium, a temperature of about 200° C. is preferred. Preferably the substrate is silicon, most preferably silicon comprising an electronically useful pattern; the metal is gallium, the gaseous reactant is atomic hydrogen, and the fibers formed comprise of Si. The gallium metal may be applied either in solid or droplet form or in the form of patterned droplets for patterning silicon nanowires. Gallium droplet patterns may include droplets in two-dimensional and three-dimensional channels for directed growth.

Another preferable substrate is germanium with hydrogen as gaseous reactant. The reactant hydrogen will form germane, $GeH_x$ in the gas phase which upon decomposition on gallium surface results in the deposition of germanium into gallium droplets. The dissolved germanium grows out as germanium nanowires.

Other semiconductors materials may be synthesized according to the methods of this invention. In each case, gallium or indium metal is used as the dissolution media. Where the solid substrate is not readily etched to provide a gaseous precursor, a vapor source will be added to the reactive atmosphere. For example, GaAs substrates may be used, with a gallium drop and nitrogen in the gas phase, to grow GaN nanofibers.

The present invention is for a process for synthesizing bulk amounts of semiconductor fibers by forming a low-melting and non-catalytic metal on a substrate, placing the combination in a low-pressure chamber, adding gaseous reactant, applying sufficient microwave energy to raise the temperature in the chamber to a point above the melting point of the metal and continuing the process until fibers of the desired length are formed. The substrate selected can be silicon, the non-catalytic metal is gallium or indium, the gaseous reactant is atomic hydrogen, and the fibers comprise of silicon.

The instant invention also provides a process of synthesizing silicon fibers, the steps including forming a gallium layer about 100 microns thick on a silicon substrate, placing the combination in a low-pressure chamber, reducing the pressure in the chamber to 50 Torr, adding hydrogen gas, applying sufficient microwave power to raise the temperature in the chamber to 50° C. and continuing the process until the fibers are of the desired length.

These and other objects of the present invention will be more fully understood from the following description of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

This invention provides a novel synthesis route for growing one-dimensional structures of semiconductor materials in wire, whisker and rod shapes at temperatures well under 550° C., preferably less than 300° C. This low-temperature synthesis is made possible by the use of gallium as a preferable absorption site. Gallium has a low melting temperature (~30° C.) and broad temperature range for the melt phase (30–2400° C. at 1 atm). Indium, which has a melting temperature of 156.6° C., and a melt range of 156.6 to 2000° C., is also useful as a dissolution medium. In one embodiment of the invention, growth of silicon fibers was observed when silicon substrates covered with a thin film of gallium were exposed to mixture of nitrogen and hydrogen in a microwave-generated plasma. The resulting silicon wires ranged from several microns to less than ten (10) nanometers in diameter. The observed growth rates were on the order of 100 microns/hour. Results indicate that this technique is capable of producing oriented rods and whiskers with narrow diameter distributions. The growth mechanism in this method is hypothesized to be similar to that in other VLS process, i.e., rapid dissolution of silicon solute in gallium melt, formation of nuclei, nuclei surfacing out of the gallium melt, growth of silicon in one dimension in the form of fibers.

This technique offers several advantages over conventional VLS techniques using silicon-transition metal eutectic for catalyzed growth. When the desired fibers comprise silicon or germanium, there is no need to supply silicon or germanium in solid form. Secondly, the very low temperatures required when using gallium as the dissolution medium allows easier integration with other processing techniques and materials involved in electronics and opt-electronic device fabrication. Nanometer scale one-dimensional semiconductor structure such as nanowires and nonwhiskers are expected to be critically important in advanced mesoscopic electronic and optical device applications.

The advantage of low-temperature fabrication are also useful for those semiconductors in which the substrate and the fibers differ in composition. In such case, both or all fibers components may be provided in the vapor phase.

To more explicitly teach the methods of this invention, the following detailed embodiments are provided for purposes of illustration only. Those skilled in the art may readily make substitutions and variations in substrates and reactants to synthesize other semiconductors on a gallium catalyst. Such substitutions and variations are considered to be within the spirit and scope of this invention. The following examples describe preferred embodiments of the invention. It is intended that the specification, together with the examples, be considered exemplary only, with the scope and spirit of the invention being indicated by the claims which follow the examples.

EXAMPLE 1

Bulk Synthesis of Silicon Fibers

Figure 1:
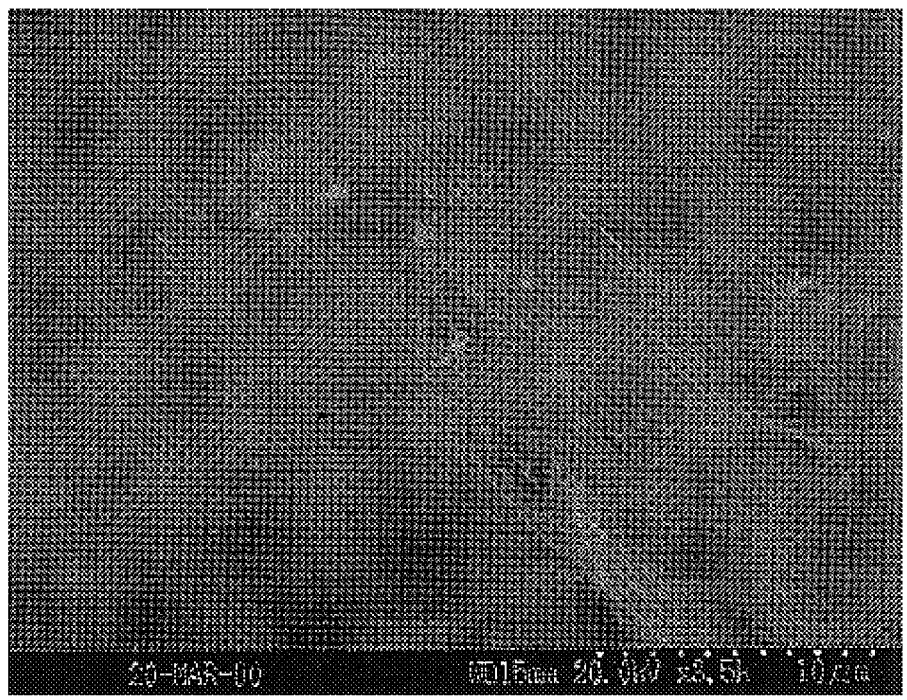
FIG. 1 shows a multitude of nanowires. These fibers were grown with $H_2/N_2$ ratio of 0.005, pressure of 30 Torr and microwave power of 1000W.
Figure 2:
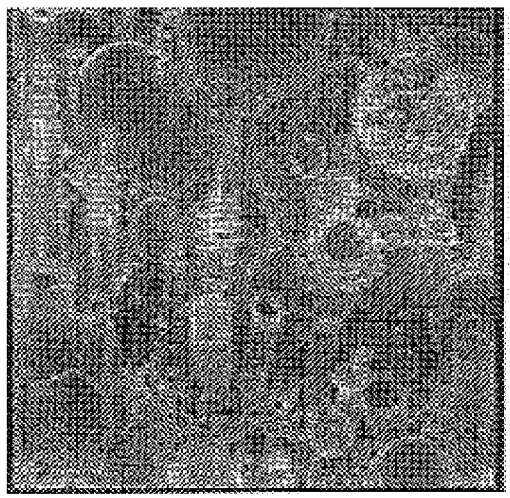
FIG. 2 shows silicon nanofibers for short time scale growth (initial one hour)
Figure 3:
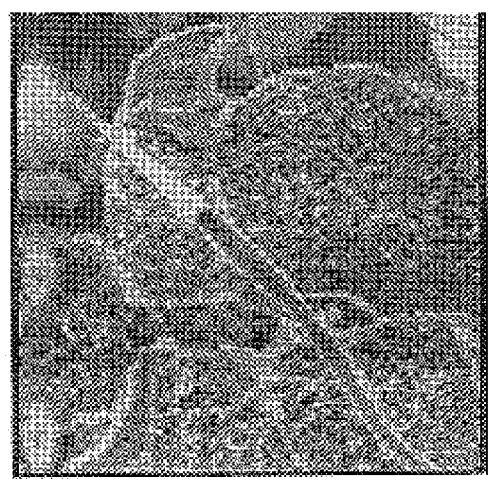
FIGS. 3 shows a silicon nanoneedle after a growth experiment for 3 hours. $H_2/N_2$ ratio was kept at 0.008. Chamber pressure was 40 Torr and 800 W of microwave power was applied.
Figure 4:
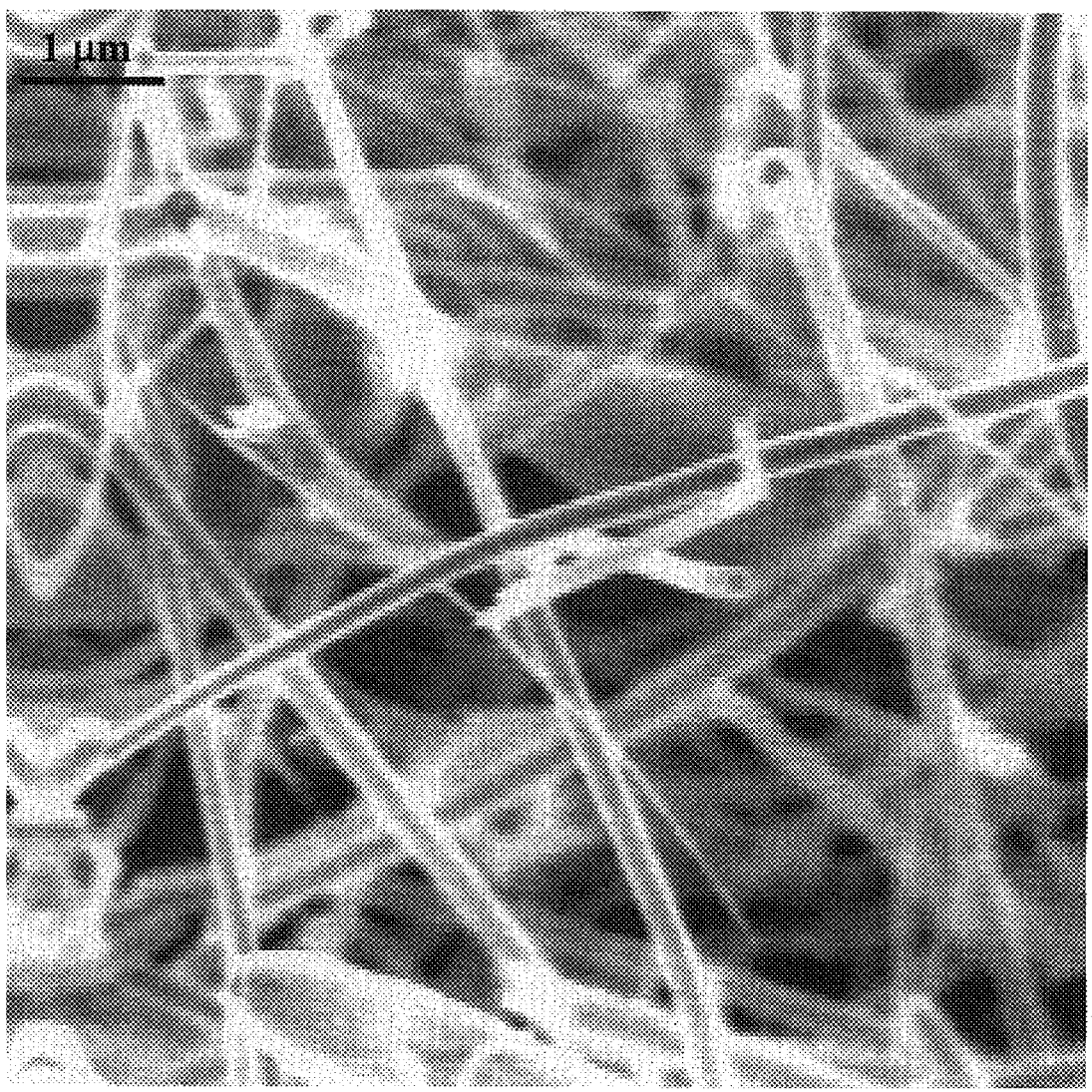
FIG. 4 shows a web of fibers grown for a longer time, five hours. Due to the long growth duration, the grown wires were very long and intermingled.
Figure 5:
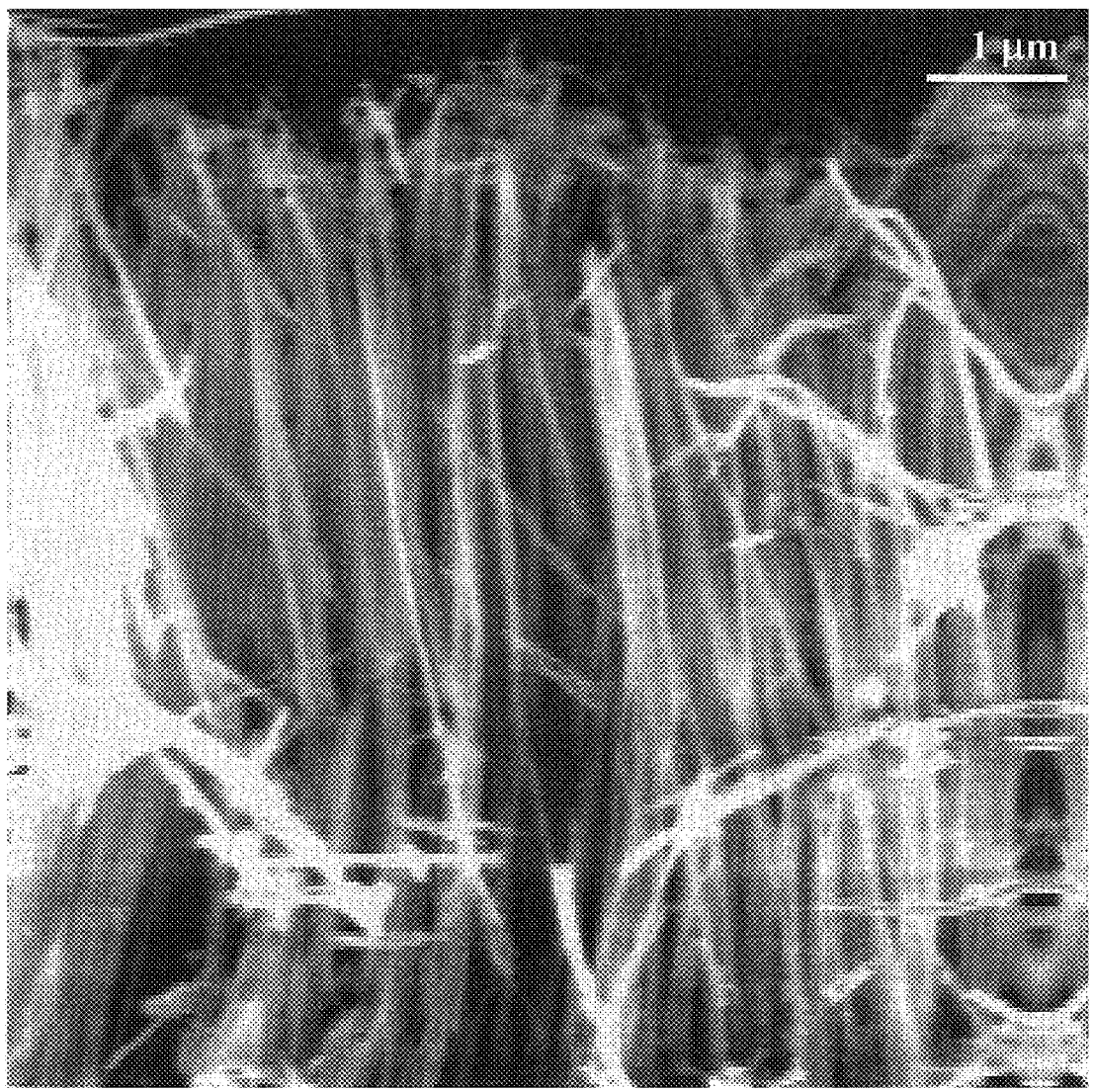
FIG. 5 shows a multitude of oriented silicon fibers. These fibers were grown with $H_2/N_2$ ratio of 0.0075, pressure of 50 Torr and 1000 W of microwave power.
Figure 6:
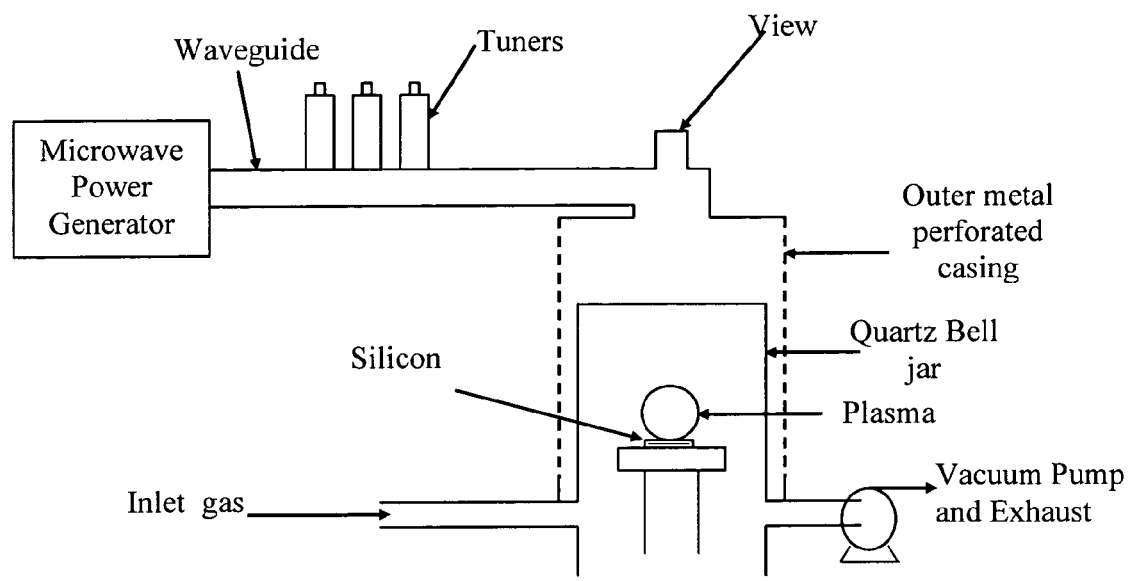
FIG. 6 is a schematic of the reaction chamber.
Figure 7:
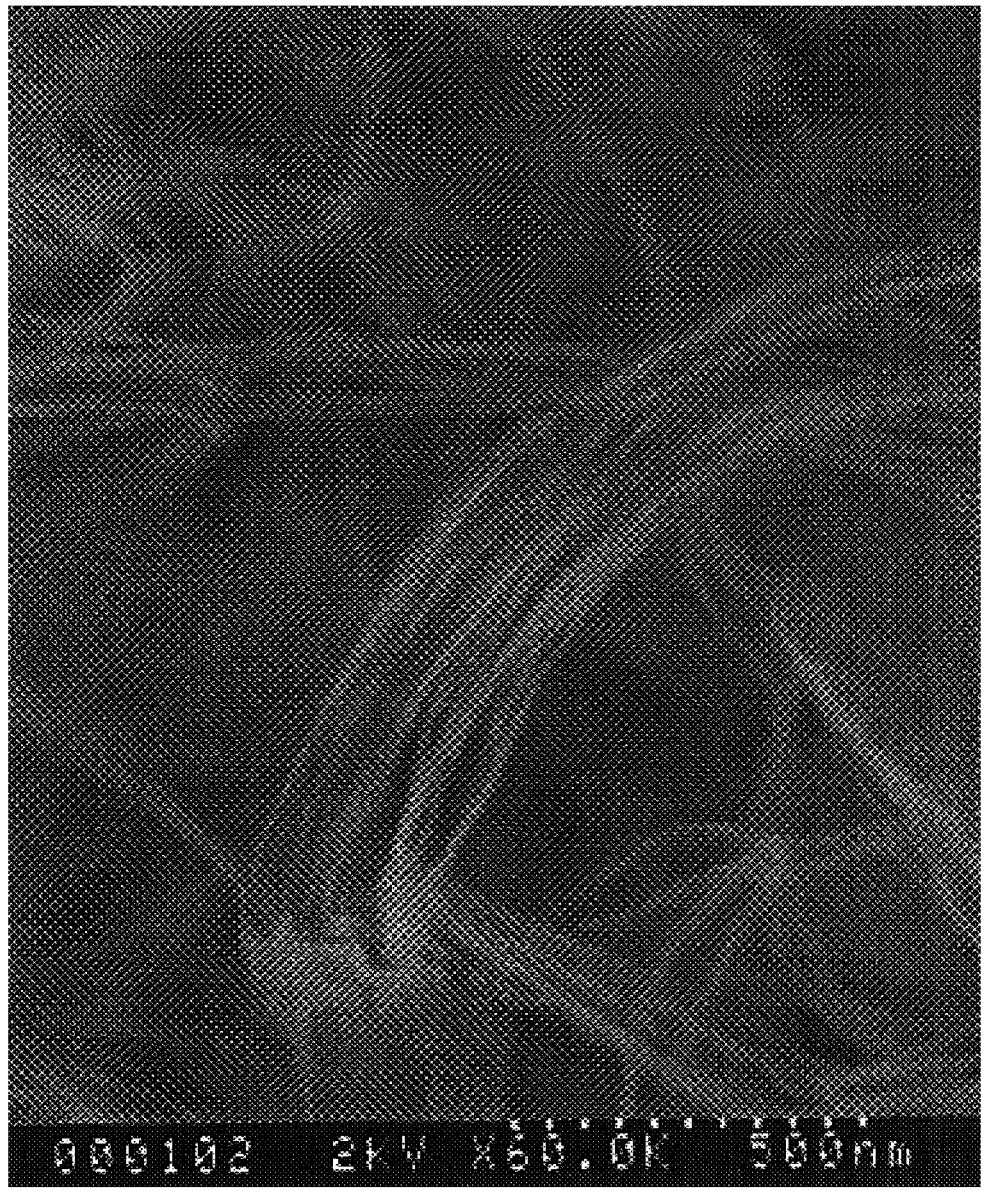
FIG. 7 shows silicon Nanowires grown using our Ga and plasma mediated VLS process wherein the silicon nanowires (~10 nm size) growing as a multitude of filaments after a growth experiment for 8 hours with a microwave power of 600 W, 30 torr pressure, and a total flow rate of 100 sccm of hydrogen.
Figure 8:
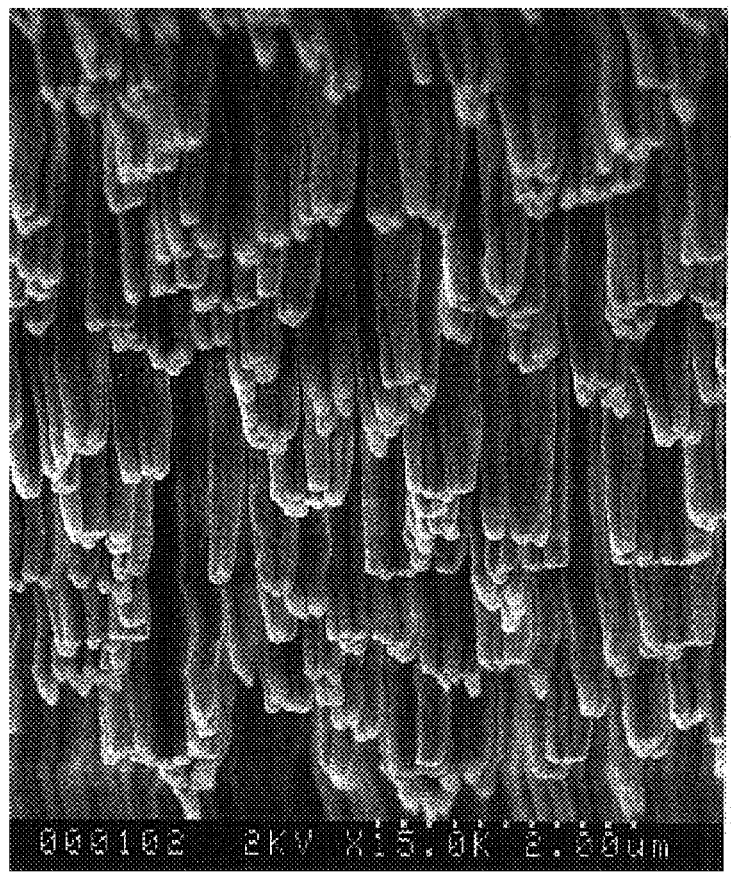
FIG. 8 shows silicon nanorods 150 nm thick, grown out of large gallium pool after a growth experiment for 5 hours with a microwave power of 900 W, 50 torr pressure, and a total flow rate of ~100 sccm of hydrogen with inlet $H_2/N_2$ ratio of 0.75.
Figure 9:
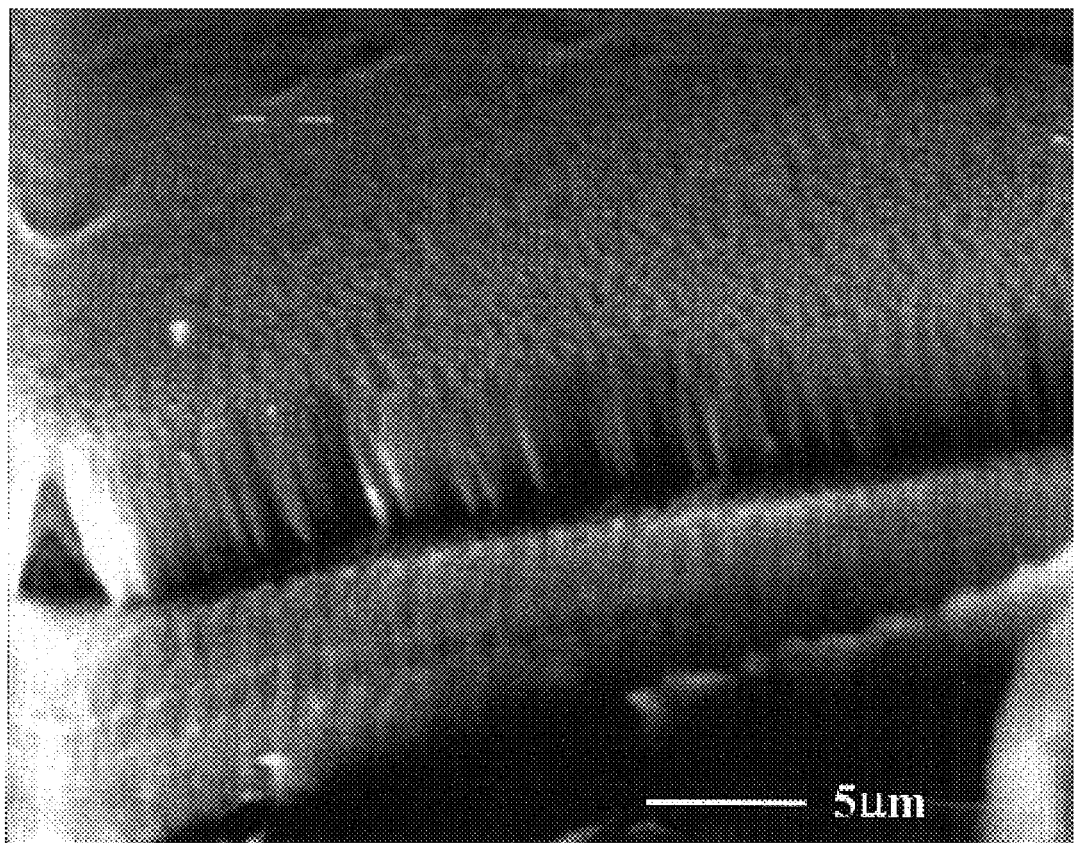
FIG. 9 illustrates oriented growth of silicon nanowires ~100 nm thick, using pools of gallium melt employing experimental conditions of a microwave power of 850 W, Pressure of 50 torr, growth duration of 5 hrs, and inlet $H_2/N_2$ ratio of 0.75.
Figure 10:
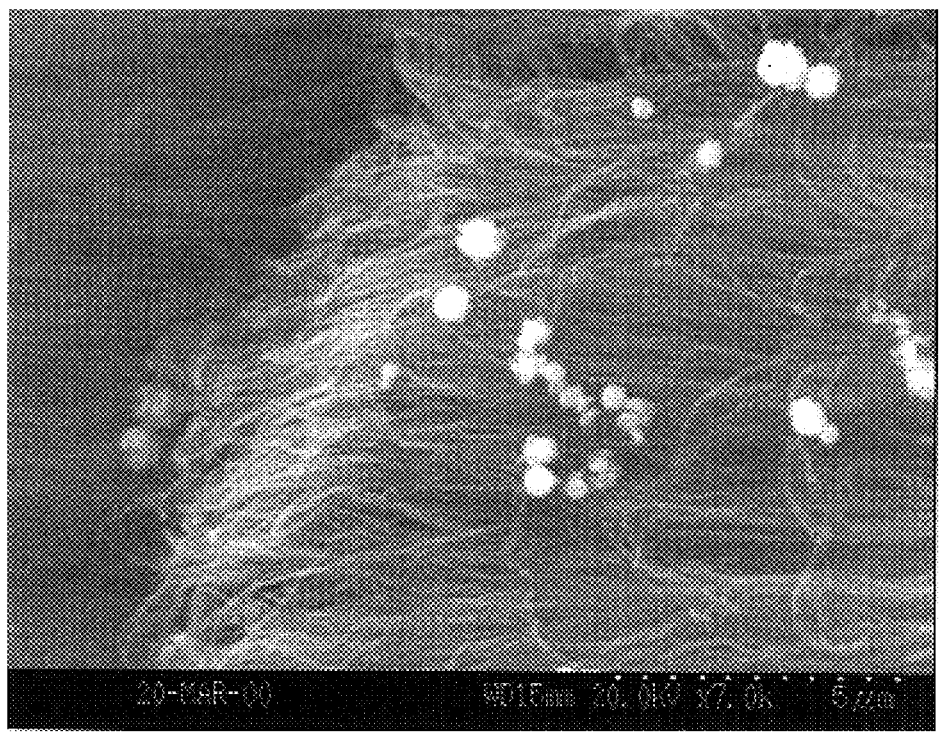
FIG. 10 shows bulk quantities of silicon nanowires produced after a growth experiment for 5 hours with microwave power of 900 W, pressure of 50 torr, and a total flow rate of 100 sccm of hydrogen.
Figure 11:
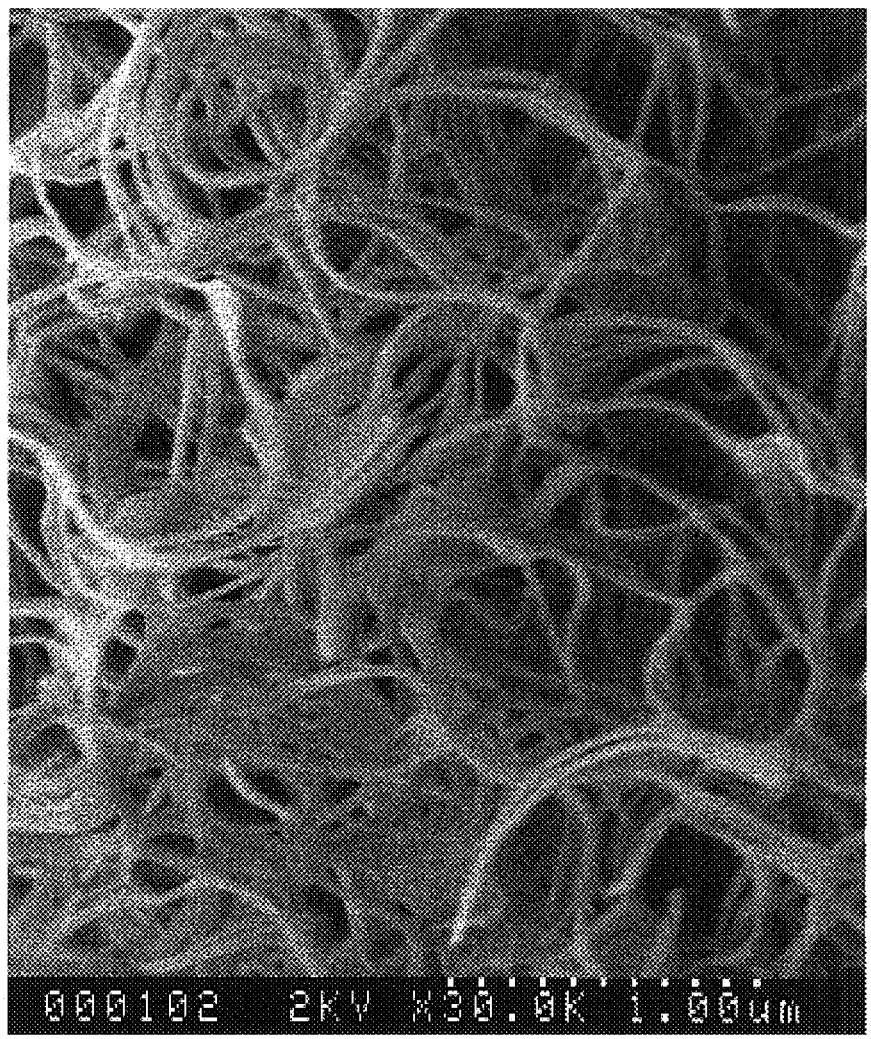
FIG. 11 shows spaghetti like wires grown out of a different gallium droplet on the same substrate as processed in FIG. 10.
Figure 12:
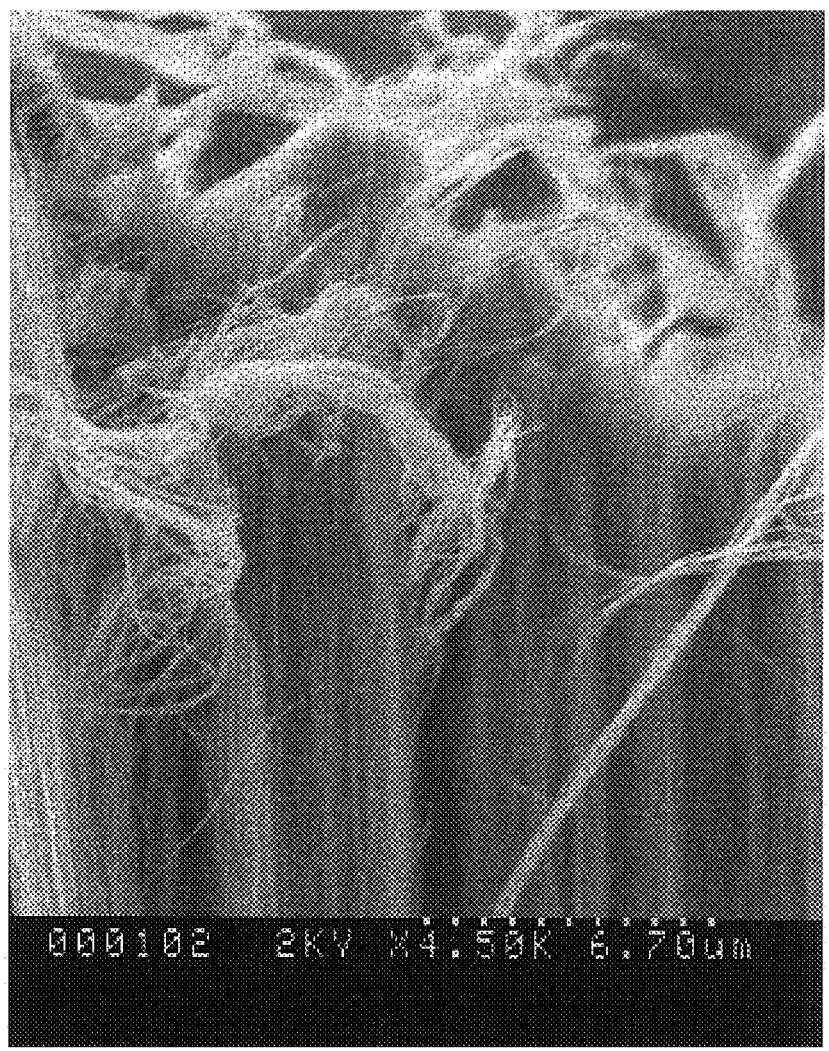
FIG. 12 shows bulk quantities of very straight silicon nanowires grown using the process of the present invention wherein the growth conditions utilized 1000 W microwave power, 50 torr pressure, growth duration of 6 hours, total gas flow rate of ~100 sccm with inlet $H_2/N_2$ ratio of 0.75.
Figure 13:
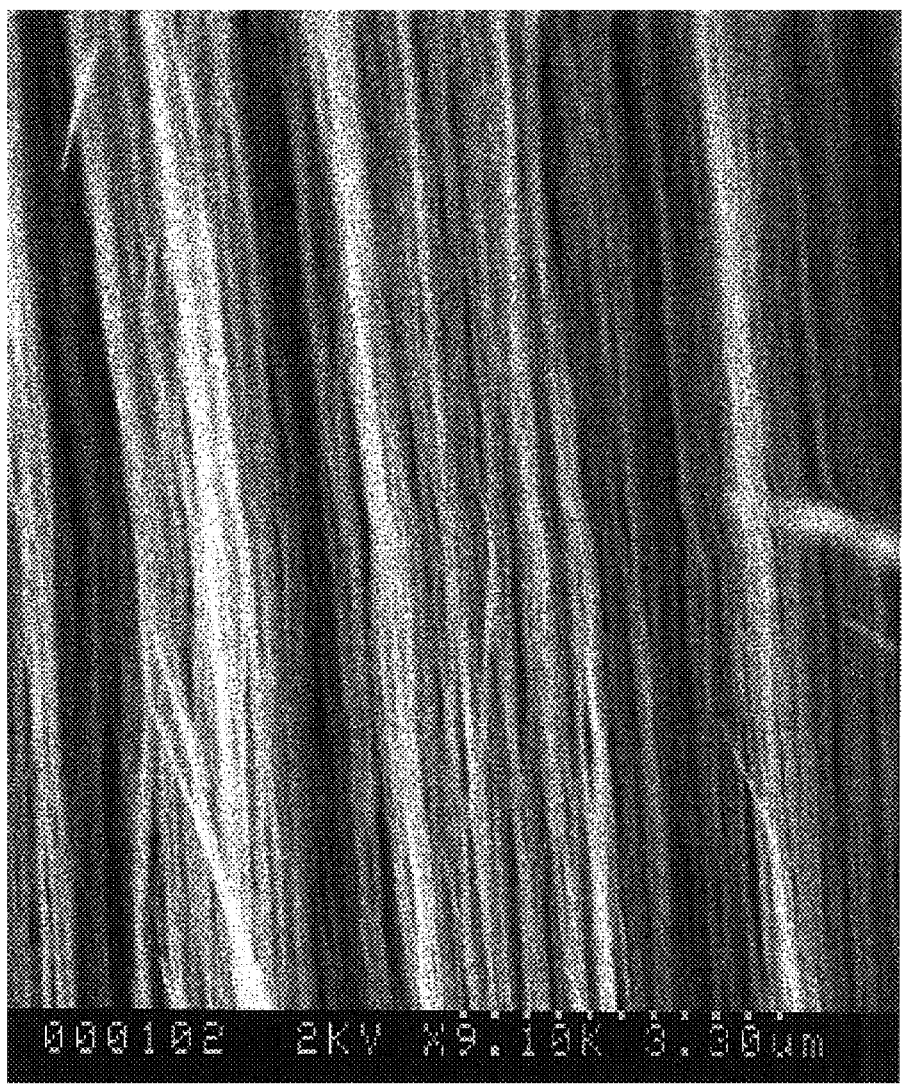
FIG. 13 shows a higher magnification SEM image of the wires grown out of a different droplet on the same substrate as in FIG. 12.
Figure 14:
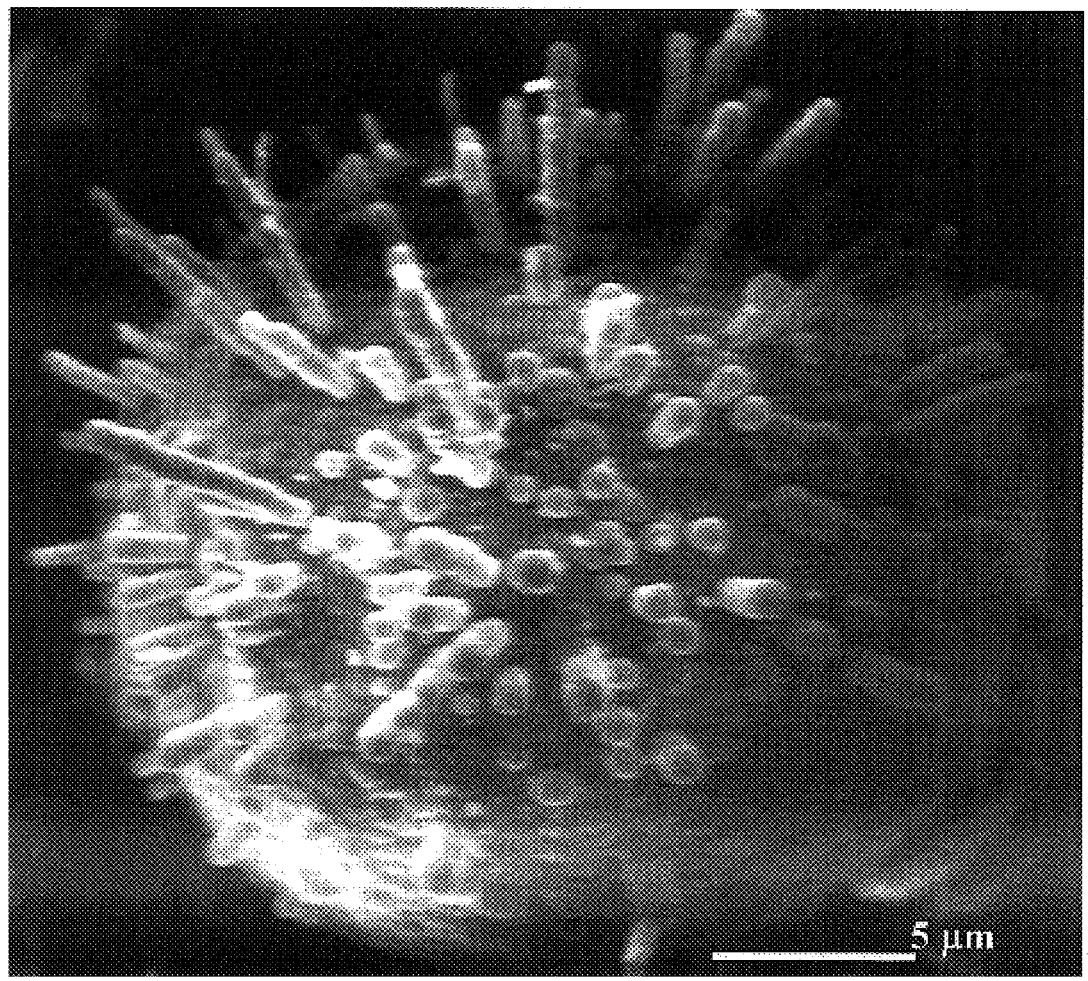
FIG. 14 demonstrates nucleation of multiple sub-micron and nano-scale, silicon wires from a single gallium droplet wherein the growth conditions utilized 1000 W power, 30 torr, 3 hrs duration, and $H_2/N_2$: 0.25.
Figure 15:
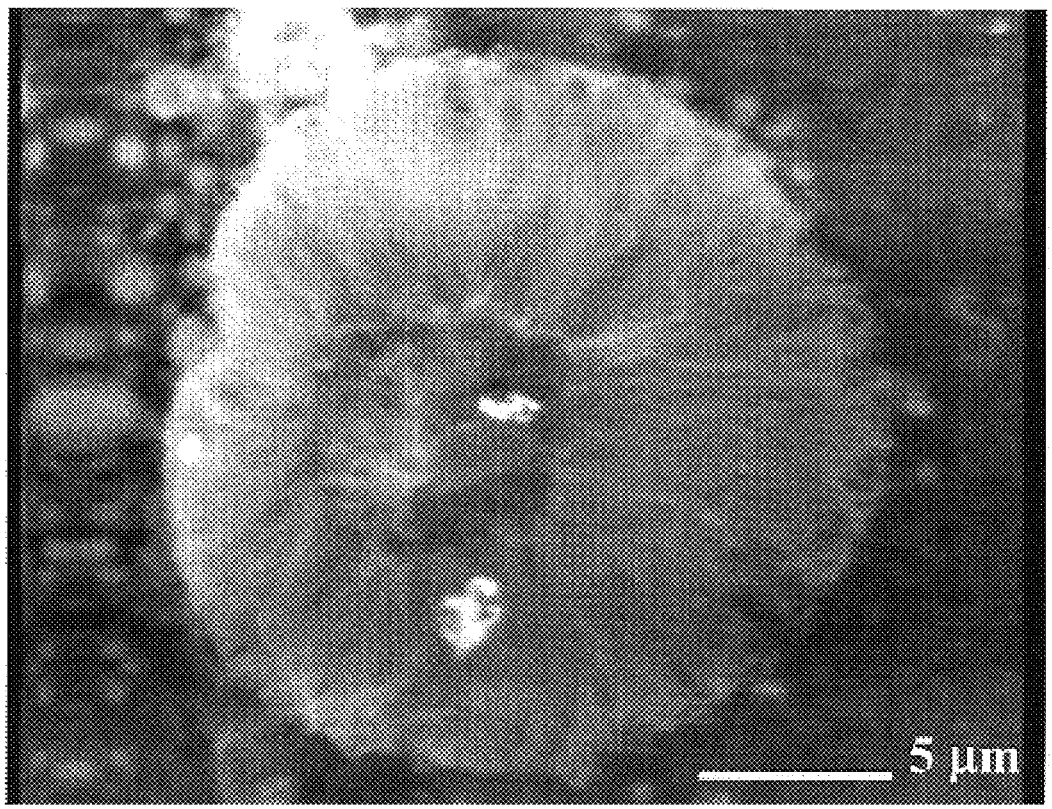
FIG. 15 shows SEM image of multiple nanowires 50 nm thick growing out of a single large gallium droplet wherein the growth conditions used 950 W power, 50 torr pressure, 7 hrs duration and $H_2/N_2$ of 0.95.
Figure 16:
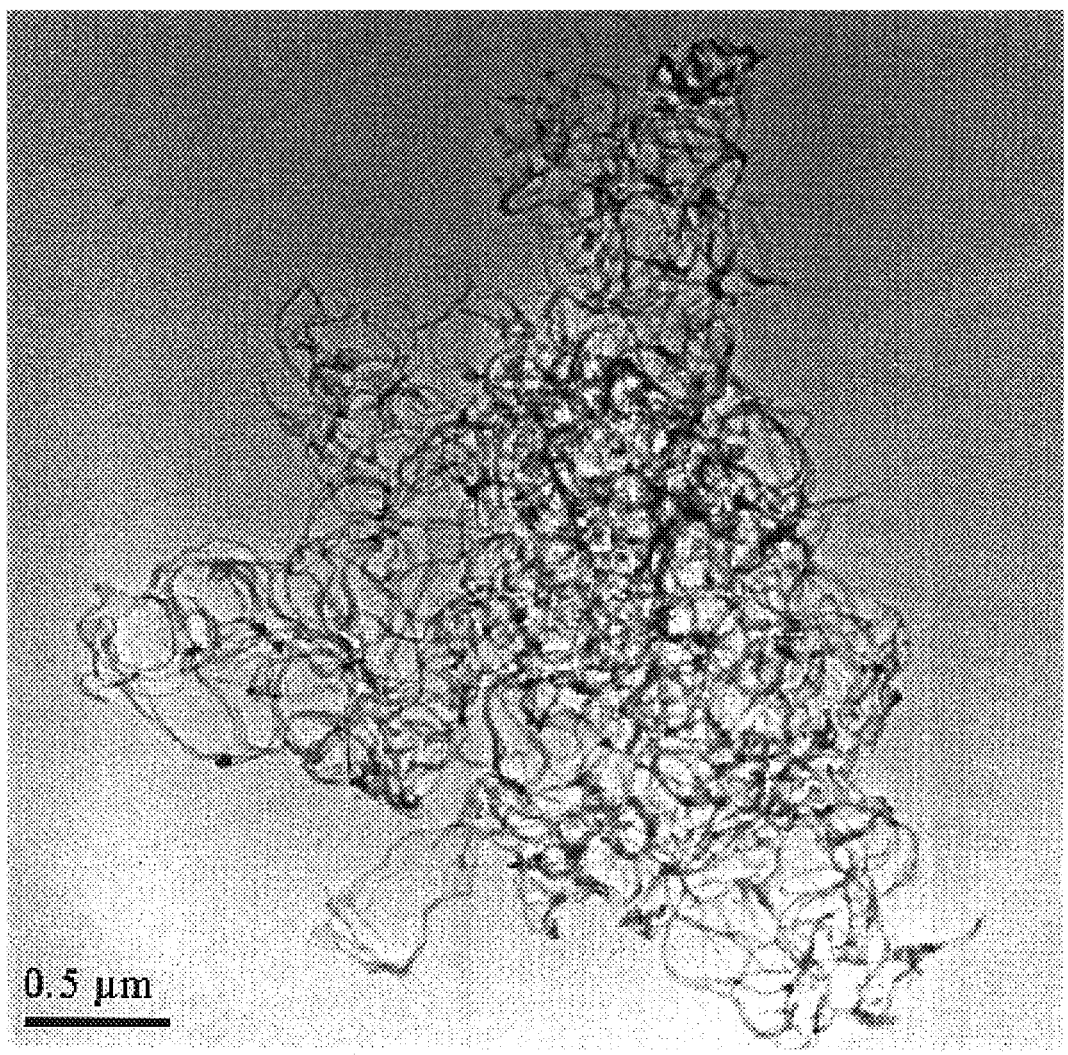
FIG. 16 shows a low magnification Transmission Electron Microscope image of a web of silicon nanowires grown under the same conditions as the sample shown in FIG. 7.
Figure 17:
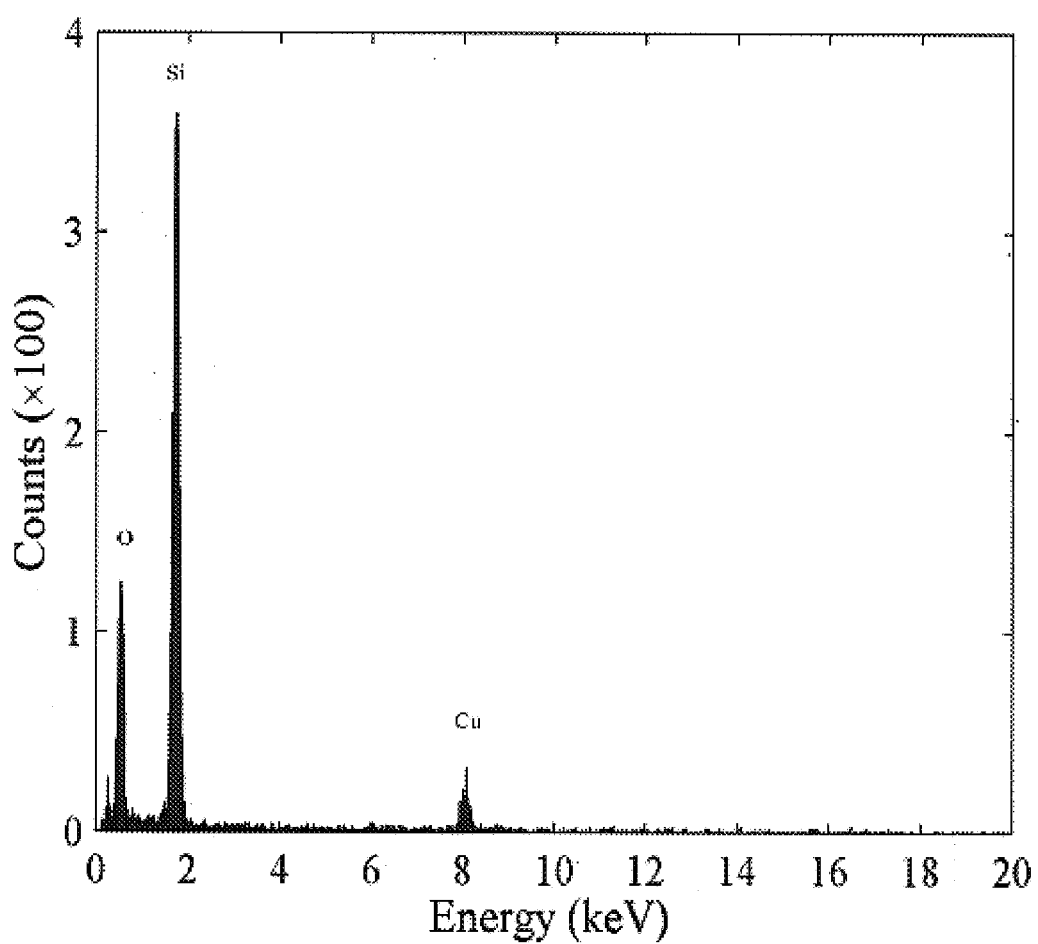
FIG. 17 shows a typical Energy Dispersive Spectroscopy spectrum taken from an individual nanowires, confirming the nanowires to be composed of silicon with some surface native oxide.
Figure 18:
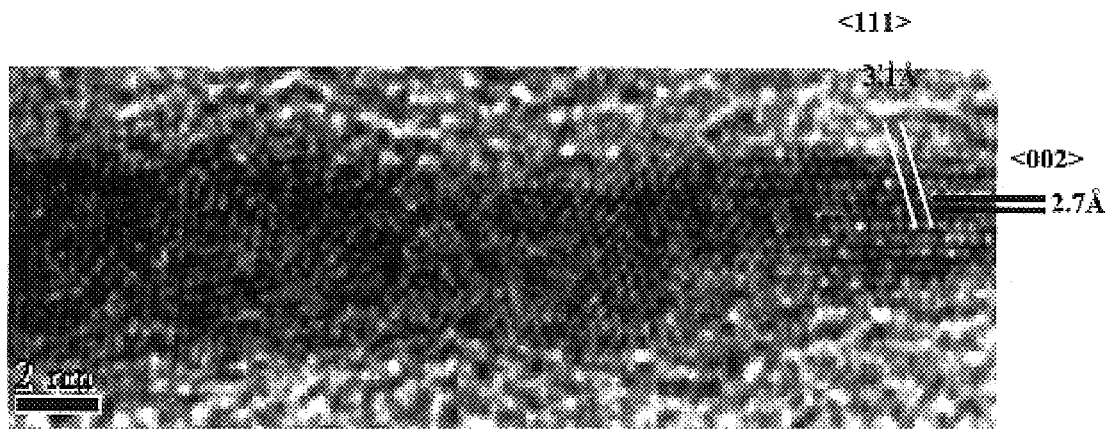
FIG. 18 shows a high Resolution Transmission Electron Microscopy (HRTEM) image of a 4 nm thick silicon nanowires wherein the lattice spacing matches that of bulk silicon.
Figure 19:
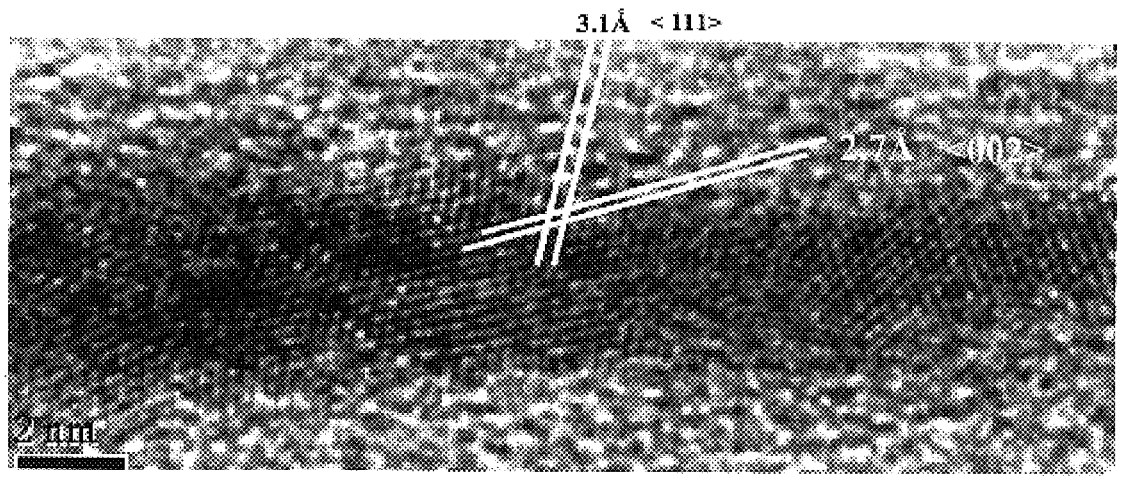
FIG. 19 shows a high Resolution Transmission Electron Microscopy (HRTEM) image of a 4 nm thick silicon nanowires wherein the lattice spacing matches that of bulk silicon.

A silicon substrate (2 cm×2 cm) was prepared by cleaning with a 45% HF solution, thoroughly rinsing in acetone and ultra-sonication. Droplets of gallium metal at 70° C. were applied to form a film with a thickness of approximately 100 microns. The nitrogen flow rate was set to 100 sccm. The pressure in the reactor was set to 30 Torr. Microwaves at 2.45 Ghz were used to ionize the nitrogen gas. The input microwave power was 1000W. The experiments were done in an ASTeX model 5010 bell jar reactor chamber equipped with an ASTeX model 2115 1500 W microwave power generator. 0.5 sccm of hydrogen were introduced into the nitrogen plasma. The reaction was carried out for six hours. Graphite blocks were used as substrate stage. The quartz bell jar volume was approximately 2000 cc. FIG. 6 shows a schematic of the reactor. After the growth experiments, the silicon substrate covered with an ashy mass was observed under a scanning electron microscope (SEM). FIGS. 1 through 16 show micrographs of silicon fibers of various thickness and length. FIG. 1 shows a group of nanowires. These fibers were grown with $H_2/N_2$ ratio of 0.005, pressure of 30 Torr and microwave power of 1000W. FIG. 2 shows silicon nanofibers for short time scale growth (initial one hour). FIG. 3 shows a silicon nanoneedle. $H_2/N_2$ ratio was kept at 0.008. Chamber pressure was 40 Torr and 800 W of microwave power was applied. FIG. 4 shows a web of fibers grown for a longer time, five hours. Due to the long growth duration, the grown wires were very long and intermingled. The limitation on wire length is time-dependant, but not process-dependant. FIG. 5 shows a multitude of oriented silicon fibers. These fibers were grown with $H_2/N_2$ ratio of 0.0075, pressure of 50 Torr and 1000 W of microwave power. FIG. 7 shows silicon Nanowires grown using the instant Ga and plasma mediated VLS process. Silicon nanowires (~10 nm size) growing as a multitude of filaments after a growth experiment for 8 hours with a microwave power of 600 W, 30 torr pressure, and a total flow rate of 100 sccm of hydrogen. The micrograph was taken using a Hitachi S900 Field Emission Scanning Electron Microscope at an acceleration voltage of 2 kv and a magnification of ×60 K. FIG. 8 shows oriented silicon nanorods 150 nm thick, grown out of large gallium pool after a growth experiment for 5 hours with a microwave power of 900 W, 50 torr pressure, and a total flow rate of ~100 sccm of hydrogen with inlet $H_2/N_2$ ratio of 0.0075. FIG. 9 illustrates oriented growth of silicon nanowires ~100 nm thick, using large pools of gallium melt. These nanowires were grown for 5 hours with microwave power of 850 W, Pressure of 50 torr, and inlet $H_2/N_2$ ratio of 0.0075. FIG. 10 shows profuse quantities of silicon nanowires produced after a growth experiment for 5 hours with microwave power of 900 W, pressure of 50 torr, and a total flow rate of 100 sccm of hydrogen. The nanowires were imaged using a Hitachi 3200N scanning electron microscope at an acceleration voltage of 20 kV and a magnification of ×7 k. FIG. 11 shows spaghetti like wires grown out of a different gallium droplet on the same sample as in FIG. 10. FIG. 12 shows bulk quantities of very straight silicon nanofilaments grown for 6 hours with 1000 W microwave power, 50 torr pressure, and a total gas flow rate of 100 sccm with inlet $H_2/N_2$ ratio of 0.0075. FIG. 13 shows a higher magnification SEM image of the wires grown out of a different droplet on the same substrate as in FIG. 12. FIG. 14 demonstrates the fact that multiple nanowires can nucleate and grow out of a large gallium pool in our technique, unlike in traditional VLS techniques, where one has to create nanometer sized catalyst particles. Multiple sub-micron and nano-scale silicon wires are shown to grow out of a single large gallium droplet. These fibers were grown for 3 hours with 1000 W microwave power, 30 torr, and $H_2/N_2$ ratio of 0.0025. FIG. 15 shows SEM image of multiple nanowires 50 nm thick growing out of a single large gallium droplet. These fibers were grown for 7 hours with a microwave power of 950 W, pressure of 50 torr and $H_2/N_2$ ratio of 0.0095. FIG. 16 shows a web of silicon nanowires grown under the same conditions as the sample shown in FIG. 7. These nanowires imaged using a JEOL 2000FX Transmission Electron Microscope at an acceleration voltage of 200 kV and a magnification of ×300 k. The elemental composition of the fibrous structures was determined using Energy Dispersive Spectroscopy (EDX), a feature in the JEOL 2000FX microscope. FIG. 17 shows a representative EDX spectrum of an individual nanowires shown in FIG. 16. The nanowires composed of silicon, with some surface oxidation. The copper peak appeared due to the copper grid material. FIGS. 18 and 19 represent high resolution Transmission Electron Microscopy images of two different silicon nanowires about 4 nm thick. The fringes in these micrographs represent lattice planes in the nanowires. The lattice spacing was measured using the Digital Micrograph software, which matched the values for bulk silicon lattice spacings.

EXAMPLE 2

Bulk Synthesis of Gallium Oxide Fibers

Figure 20:
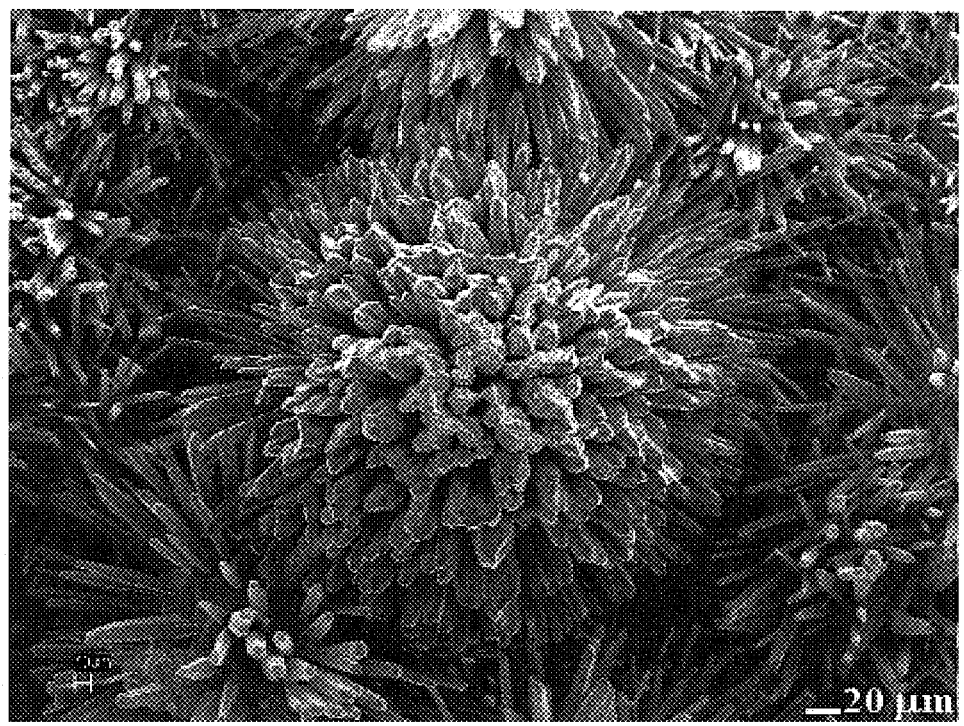
FIG. 20 shows multiple gallium oxide rods growing out of a large gallium pool with growth conditions of 4 hour growth duration, 1000 W microwave power, 30 Torr pressure, 100 sccm of hydrogen, 0.6 sccm of oxygen in the inlet stream.
Figure 21:
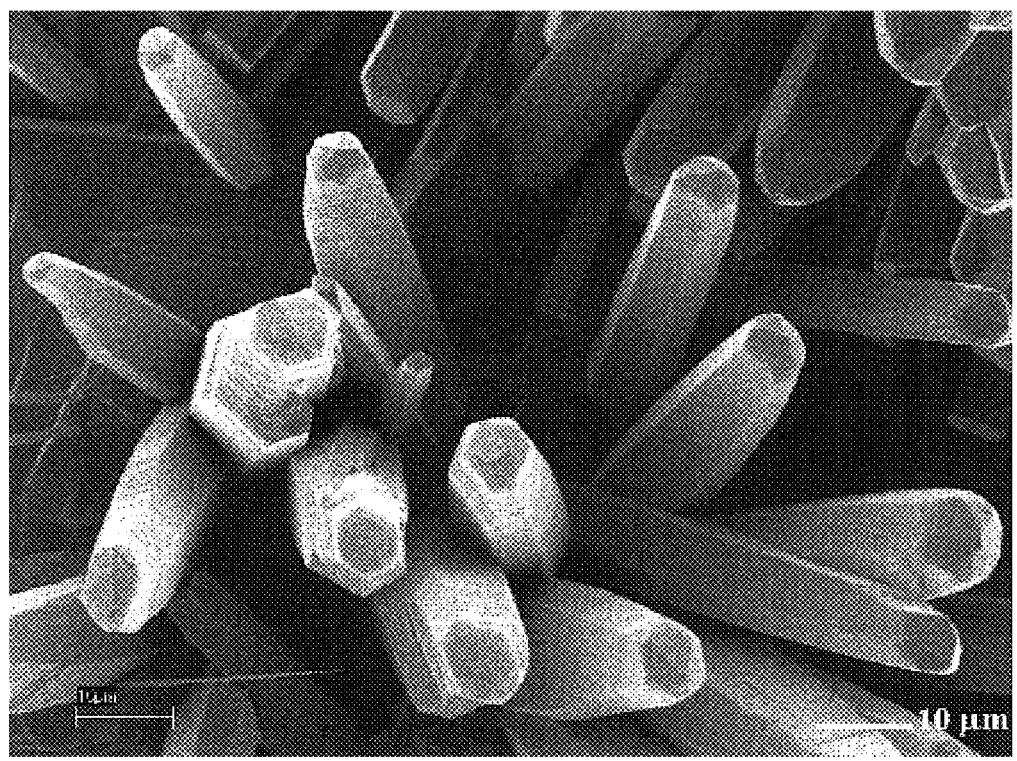
FIG. 21 shows highly faceted gallium oxide fibers on the same sample shown in FIG. 20.
Figure 22:
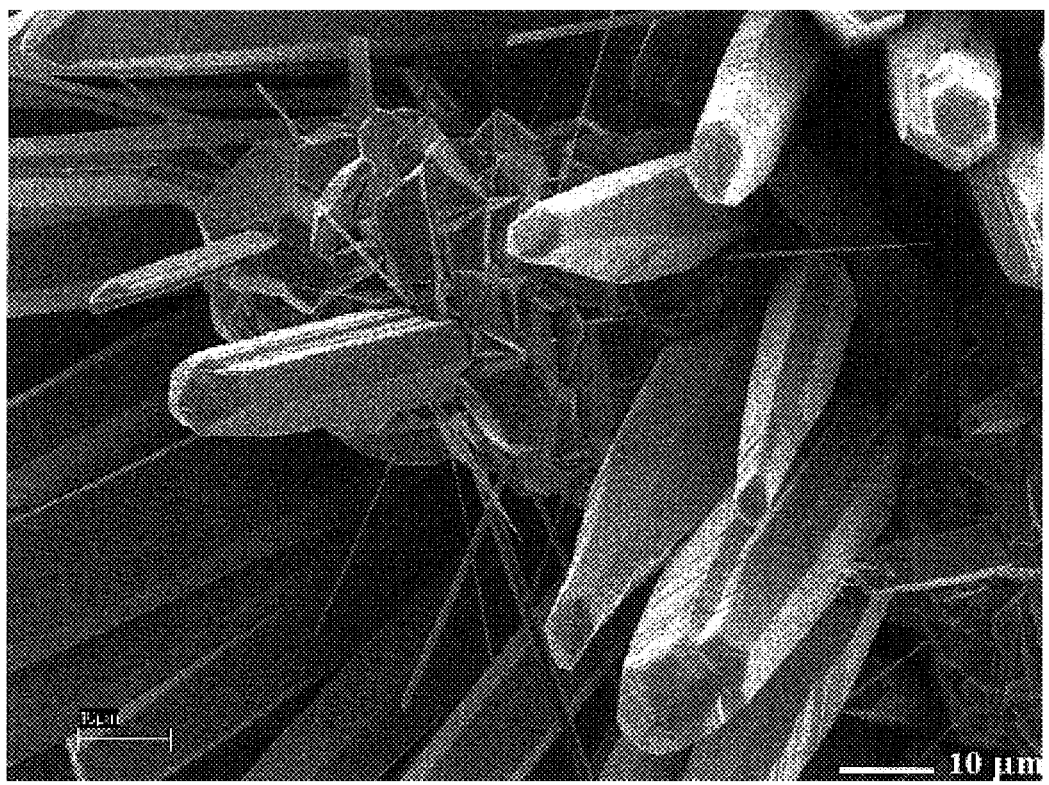
FIG. 22 shows gallium oxide sub-micron thick fibers in addition to the micron-scale rods in the same sample mentioned above.
Figure 23:
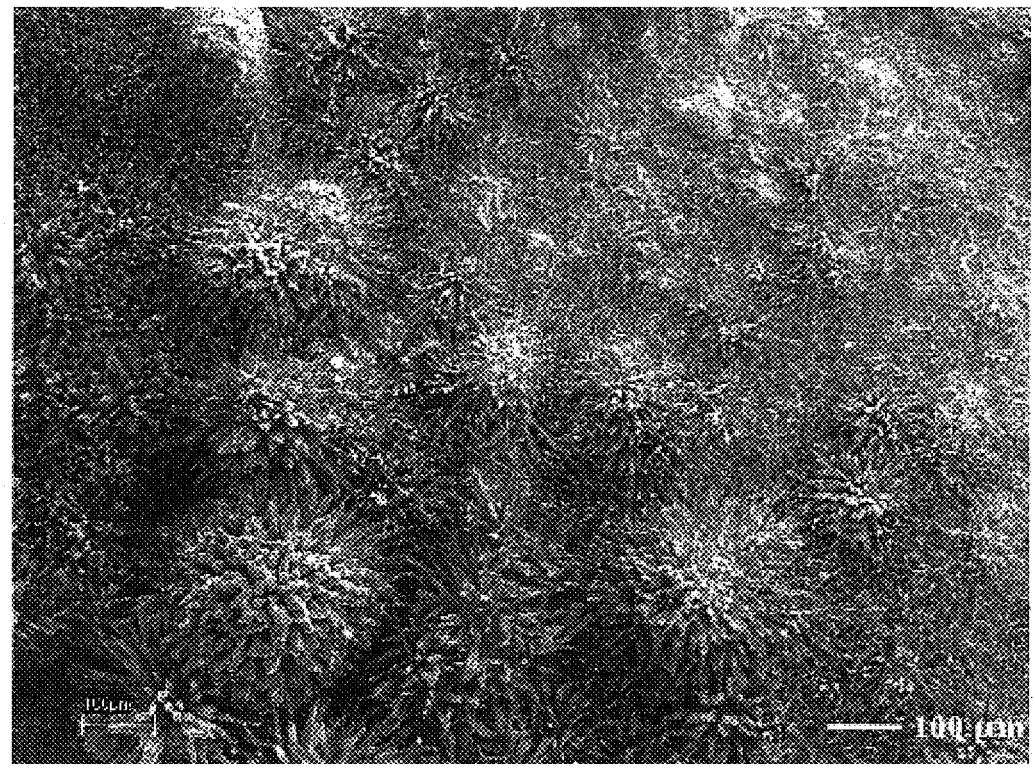
FIG. 23 shows a zoomed-out view of the quartz substrate wherein multiple fibers have been grown out of a large gallium pool.
Figure 24:
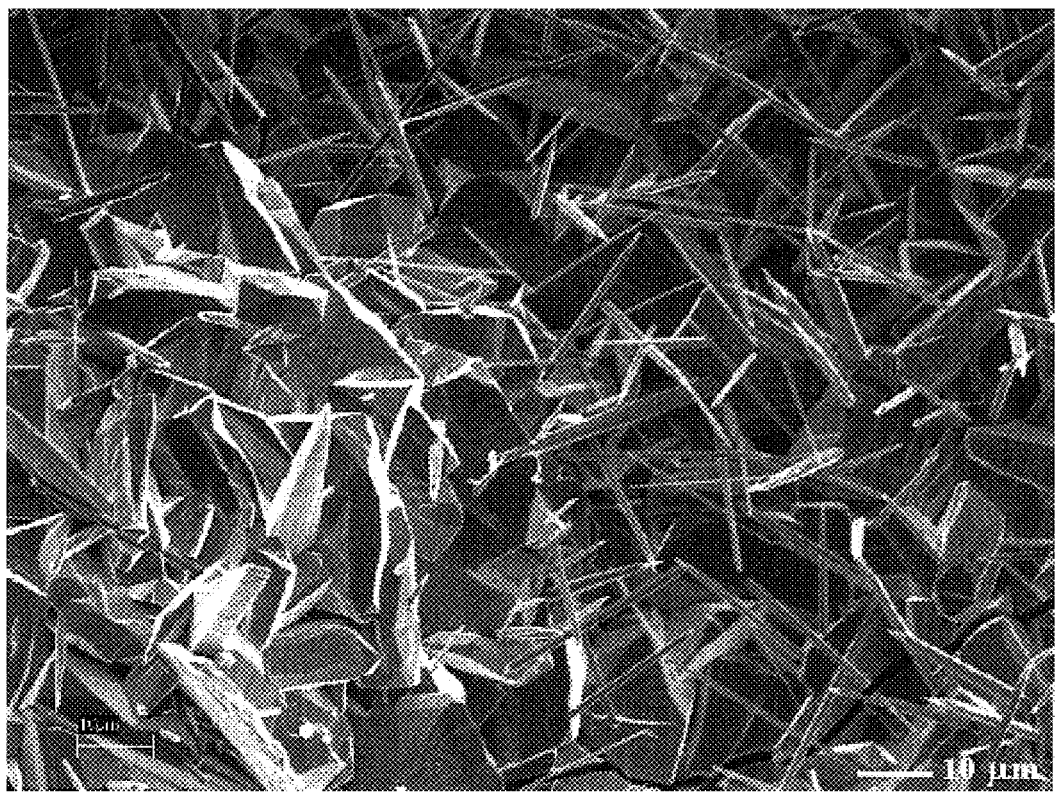
FIG. 24 shows gallium oxide nanowires about 100 nm thick from a different region on the same sample as shown in FIG. 20.
Figure 25:
FIG. 25 is another illustration of multiple nucleation and fiber growth.
Figure 26:
FIG. 26 shows a scanning electron microscopy image of gallium oxide platelets and crystals obtained in addition to the one-dimensional structures after a growth experiment under the same conditions as for sample in FIG. 20, whereby growth of gallium oxide can also be achieved with a range of above-mentioned process parameters and with different substrate materials.
Figure 27:
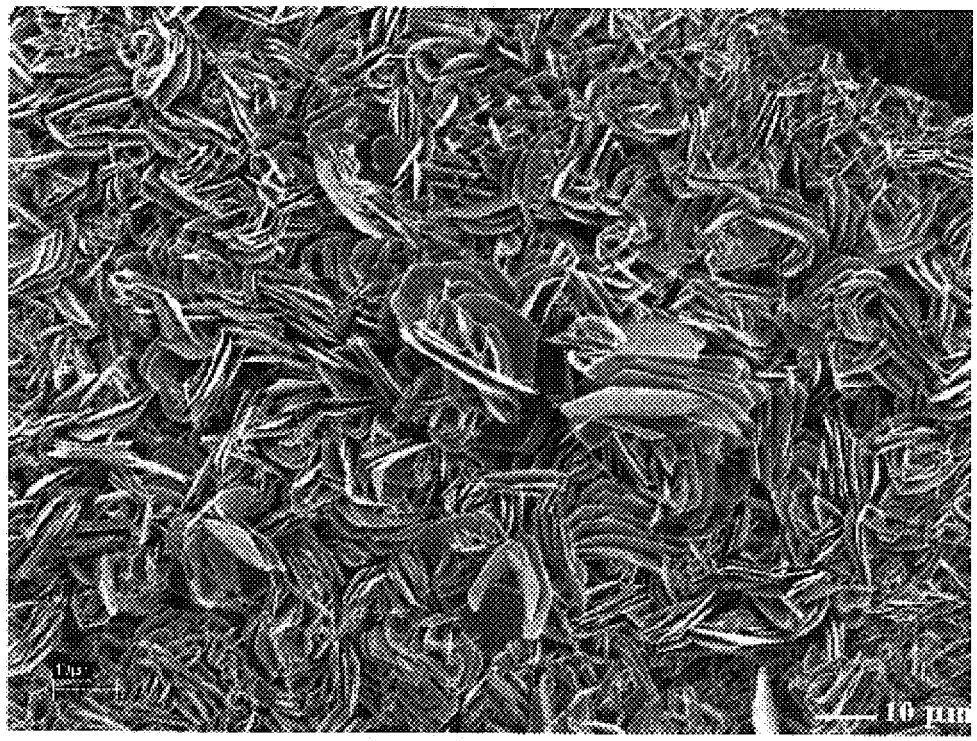
FIG. 27 shows a scanning electron microscopy image of gallium oxide platelets and crystals obtained in addition to the one-dimensional structures after a growth experiment under the same conditions as for sample in FIG. 20, whereby growth of gallium oxide can also be achieved with a range of above-mentioned process parameters and with different substrate materials.
Figure 28:
FIG. 28 shows a scanning electron microscopy image of gallium oxide platelets and crystals obtained in addition to the one-dimensional structures after a growth experiment under the same conditions as for sample in FIG. 20, whereby growth of gallium oxide can also be achieved with a range of above-mentioned process parameters and with different substrate materials.
Figure 29:
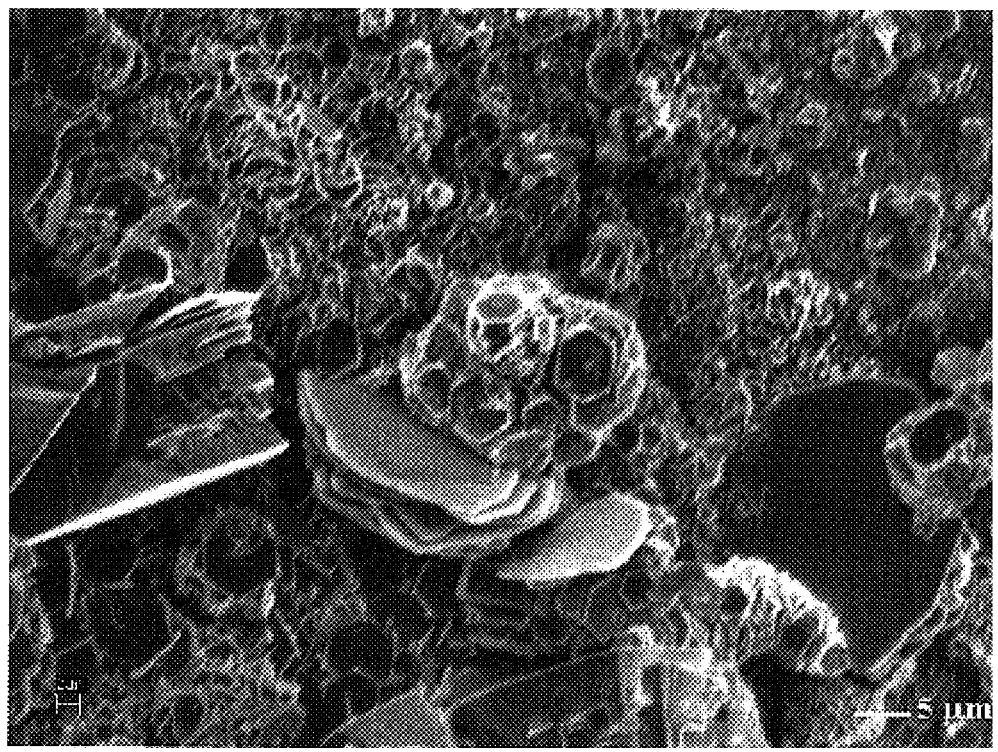
FIG. 29 shows a scanning electron microscopy image of gallium oxide platelets and crystals obtained in addition to the one-dimensional structures after a growth experiment under the same conditions as for sample in FIG. 20, whereby growth of gallium oxide can also be achieved with a range of above-mentioned process parameters and with different substrate materials.

Gallium oxide fibers can be grown using the above plasma mediated technique. A quartz substrate (2 cm×2 cm) was prepared by ultra-sonication in IsoPropyl Alcohol. Droplets of gallium metal at 70° C. were applied to form a film with a thickness of approximately 100 microns. The hydrogen flow rate was set to 100 sccm. The pressure in the reactor was set to 40 Torr. Microwaves at 2.45 Ghz were used to ionize the hydrogen gas. The input microwave power was 700W. The experiments were done in an ASTeX model 5010 bell jar reactor chamber equipped with an ASTeX model 2115 1500 W microwave power generator. 0.6 sccm of oxygen were introduced into the hydrogen plasma. The reaction was carried out for four hours. Graphite blocks were used as substrate stage. After the growth experiments, the quartz substrate covered with a whitish mass was observed using a scanning electron microscope (SEM). FIGS. 20 through 25 show micrographs of gallium oxide fibers of various thickness and length. FIG. 20 shows multiple gallium oxide rods growing out of a large gallium pool. The fibers are very well faceted and were grown for 4 hours with 1000 W microwave power, 30 Torr pressure, 100 sccm of hydrogen, and 0.6 sccm of oxygen in the inlet stream. FIG. 21 shows highly faceted gallium oxide fibers on the same sample shown in FIG. 20. The micrographs were taken using a LEO 1430 Scanning Electron Microscope at an acceleration voltage of 20 kV. FIG. 22 shows gallium oxide sub-micron thick fibers in addition to the micron-scale rods in the same sample mentioned above. FIG. 23 shows an overall zoomed out view of the quartz substrate, demonstrating the fact that multiple fibers can nucleate and grow out of a large gallium pool using our technique. FIG. 24 shows gallium oxide nanowires about 100 nm thick from a different region on the same sample as shown in FIG. 20. FIG. 25 is another illustration of multiple nucleation and fiber growth. In addition to the one-dimensional structures, we also observed gallium oxide platelets about 100–200 nm thick, as shown in FIGS. 26 through 29. Gallium oxide fibers were also synthesized with gallium droplets spread on other substrates, such as pyrolytic boron nitride, alumina, and glassy carbon. In addition to different fractions of $O_2/H_2$ being used, fractions of methane and nitrogen were also introduced into the plasma and synthesis of gallium oxide fibers was obtained.

EXAMPLE 3

Synthesis of Carbon Nanofibers

Figure 30:
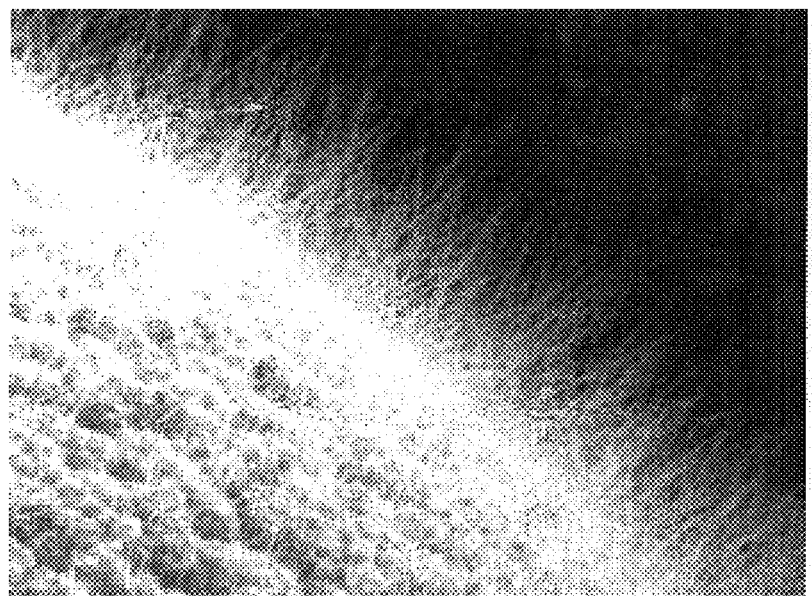
FIG. 30 shows a micrograph of carbon nanofibers of various thickness and length wherein the growth Conditions utilized a microwave power of 700 W, pressure of 40 torr, 4 hr duration, 100 sccm of hydrogen and 2 sccm of methane in the plasma; however these process parameters can be varied and synthesis of carbon nanowires obtained.
Figure 31:
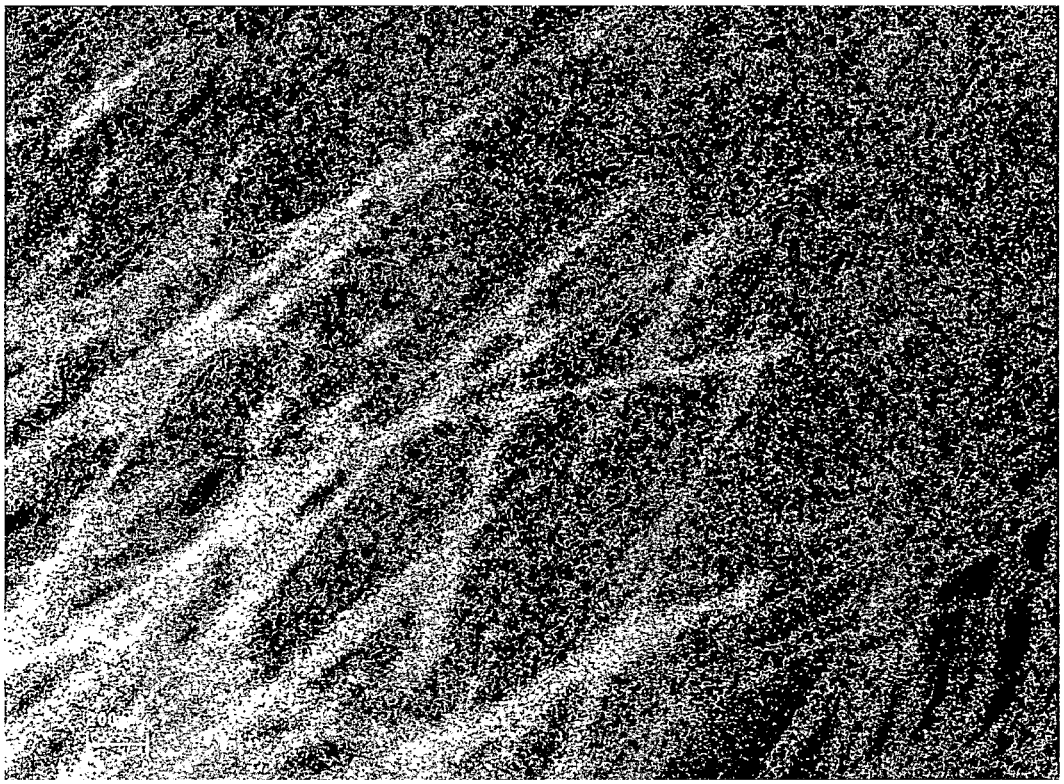
FIG. 31 shows a micrograph of carbon nanofibers of various thickness and length wherein the growth Conditions utilized a microwave power of 700 W, pressure of 40 torr, 4 hr duration, 100 sccm of hydrogen and 2 sccm of methane in the plasma; however these process parameters can be varied and synthesis of carbon nanowires obtained.
Figure 32:
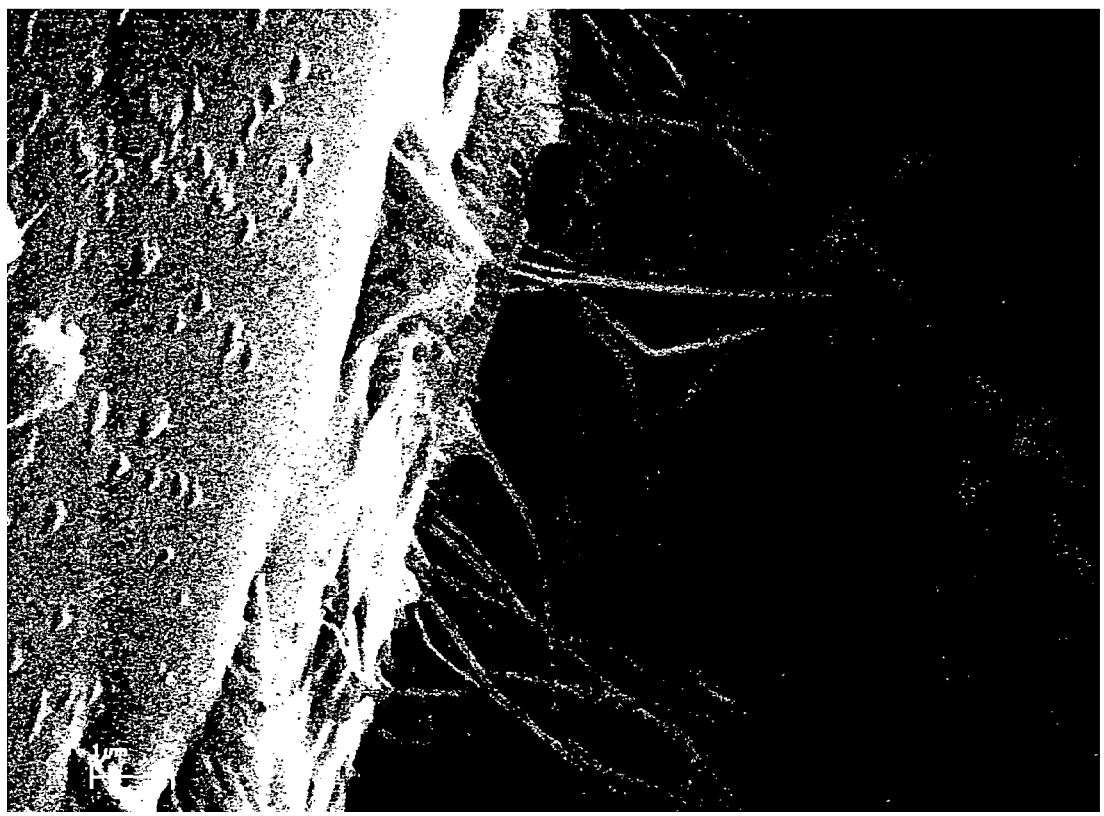
FIG. 32 shows a micrograph of carbon nanofibers of various thickness and length wherein the growth Conditions utilized a microwave power of 700 W, pressure of 40 torr, 4 hr duration, 100 sccm of hydrogen and 2 sccm of methane in the plasma; however these process parameters can be varied and synthesis of carbon nanowires obtained.
Figure 33:
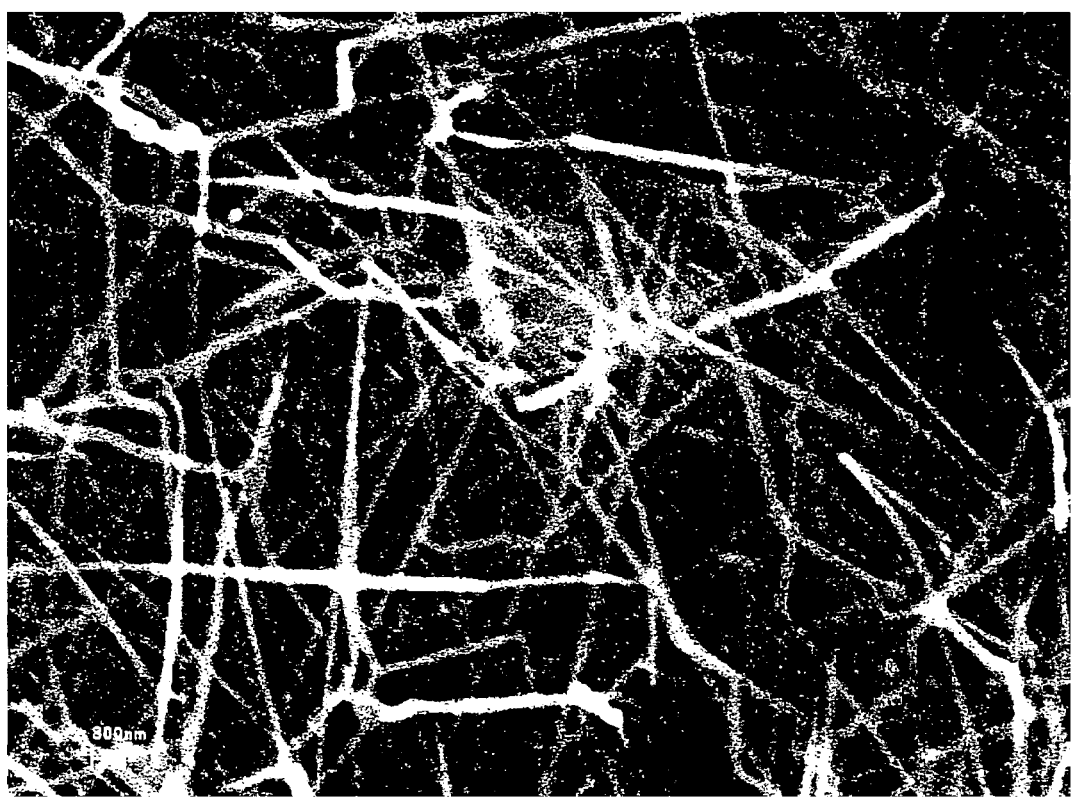
FIG. 33 shows a micrograph of carbon nanofibers of various thickness and length wherein the growth Conditions utilized a microwave power of 700 W, pressure of 40 torr, 4 hr duration, 100 sccm of hydrogen and 2 sccm of methane in the plasma; however these process parameters can be varied and synthesis of carbon nanowires obtained.

Carbon nanofibers have been grown using the above plasma-mediated technique. A pyrolytic boron nitride substrate (~1 cm×1 cm) was prepared by ultra-sonication in IsoPropyl Alcohol. The substrate was covered with molten gallium droplets. The hydrogen flow rate was set to 100 sccm. The pressure in the reactor was set to 40 Torr. Microwaves at 2.45 Ghz were used to ionize the hydrogen gas. The input microwave power was 700W. The experiments were done in an ASTeX model 5010 bell jar reactor chamber equipped with an ASTeX model 2115 1500 W microwave power generator. 2.0 sccm of methane were introduced into the hydrogen plasma. The reaction was carried out for four hours. Graphite blocks were used as substrate stage. After the growth experiments, the quartz substrate covered with a grey mass was observed using a scanning electron microscope (SEM). FIGS. 30 through 33 show micrographs of carbon nanofibers of various thickness and length. FIG. 30 shows multiple carbon filaments growing out of a large gallium droplet. The fibers FIG. 31 shows a higher magnification image of approximately 50 nm thick nanofilaments.

EXAMPLE 4

Synthesis of Germanium Fibers

Germanium fibers can be grown using the above technique by using either germanium substrate or using germane in the vapor phase. The gas phase will preferably consist of hydrogen with or without nitrogen to result in the formation of germane radicals, a gaseous source of germanium. Germane will be decomposed on the gallium substrate resulting in dissolution of germanium into the gallium melt.

EXAMPLE 5

Synthesis of Gallium Nitride Fibers

Nitrogen can also be dissolved into gallium melt, but at relatively higher temperatures than above, i.e., above ~600° C. At these temperatures, using gallium droplets exposed to an atomic nitrogen source, such as plasma, one can achieve nitrogen saturated gallium melts. These nitrogen saturated gallium melts will form gallium nitride either in the whisker or nanowire form.

EXAMPLE 6

Synthesis of Silicon Nitride Fibers and Whiskers

Using a similar setup as that used for example 1, one can expose the gallium droplet to nitrogen and hydrogen plasma at relatively higher temperature, i.e., ~600° C., to achieve the dissolution of both nitrogen and silicon into the gallium droplet.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

We claim:

1. A process of synthesizing silicon fibers, the steps comprising:
   forming a gallium layer about 100 microns thick on a silicon substrate, placing the combination in a low-pressure chamber, reducing the pressure in the chamber to 50 Torr, adding hydrogen gas, applying sufficient microwave power to raise the temperature in the chamber to 50° C. and continuing the process until the fibers are of the desired length.

2. A process of synthesizing silicon fibers, the steps comprising:
   forming a gallium layer about 100 microns thick on a silicon substrate, placing the combination in a low-pressure chamber, reducing the pressure in the chamber to 50 Torr, adding silane gas, applying sufficient microwave power to raise the temperature in the chamber to greater than 100° C. and continuing the process until the fibers are of the desired length.

3. A process of synthesizing silicon fibers, the steps comprising:

forming a gallium layer on a silicon substrate, placing the combination in a low-pressure chamber, reducing the pressure in the chamber to a vacuum from between 100 mTorr to one atmosphere, adding hydrogen gas, applying sufficient microwave power to raise the temperature in the chamber to 50° C. and continuing the process until the fibers are of the desired length.

4. A process of synthesizing silicon fibers, the steps comprising:

forming a gallium layer on a silicon substrate, placing the combination in a low-pressure chamber, reducing the pressure in the chamber to vacuum from between 100 mTorr to one atmosphere, adding silane gas, applying sufficient microwave power to raise the temperature in the chamber to greater than 100° C. and continuing the process until the fibers are of the desired length.

5. The process of claim 1, wherein said gaseous reactant comprises atomic hydrogen.

6. The process of claim 3, wherein said gaseous reactant comprises atomic hydrogen.

7. The process of claim 1, wherein said substrate comprises an electronically useful pattern.

8. The process of claim 1, including adding a nitrogen gas with said hydrogen gas.

9. The process of claim 3, including adding a nitrogen gas with said hydrogen gas.

10. The process of claim 1, wherein said gallium layer is formed from gallium oxide.

11. The process of claim 2, wherein said gallium layer is formed from gallium oxide.

12. The process of claim 3, wherein said gallium layer is formed from gallium oxide.

13. The process of claim 4, wherein said gallium layer is formed from gallium oxide.

14. The process of claim 1 including adding germane in a vapor phase forming germane radicals decomposing on said gallium substrate forming a dissolution of germanium in a gallium melt and producing multiple germanium nanofibers of the desired length.

15. The process of claim 8 including adding germane in the vapor phase forming germane radicals decomposing on said gallium substrate forming a dissolution of germanium in a gallium melt and producing multiple germanium nanofibers of the desired length.

16. The process of claim 3 including adding germane in a vapor phase forming germane radicals decomposing on said gallium substrate forming a dissolution of germanium in a gallium melt and producing multiple germanium nanofibers of the desired length.

17. The process of claim 9 including adding germane in the vapor phase forming germane radicals decomposing on said gallium substrate forming a dissolution of germanium in a gallium melt and producing multiple germanium nanofibers of the desired length.

18. The process of claim 8 wherein said substrate comprises silicon decomposing to yield a nitrogen and a silicon precursor simultaneously at a temperature of at least 600° C. achieving dissolution of said nitrogen gas and said silicon substrate into said gallium yielding nanofibers comprising a silicon nitride alloy.

19. The process of claim 9 wherein said substrate comprises silicon decomposing to yield a nitrogen and a silicon precursor simultaneously at a temperature of at least 600° C. achieving dissolution of said nitrogen gas and said silicon substrate into said gallium yielding nanofibers comprising a silicon nitride alloy.

20. The process of claim 2, wherein said substrate comprises an electronically useful pattern.

21. The process of claim 3, wherein said substrate comprises an electronically useful pattern.

22. The process of claim 4, wherein said substrate comprises an electronically useful pattern.

* * * * *